US012585693B2

(12) United States Patent
Song et al.

(10) Patent No.: US 12,585,693 B2
(45) Date of Patent: Mar. 24, 2026

(54) METHOD FOR PROVIDING CUSTOMIZED CONTENT AND ELECTRONIC DEVICE SUPPORTING THE SAME

(71) Applicant: AIBE Inc., Los Angeles, CA (US)

(72) Inventors: Steven Song, Los Angeles, CA (US); Young Hwan Choi, Los Angeles, CA (US)

(73) Assignee: AIBE Inc., Los Angeles, CA (US)

( * ) Notice: Subject to any disclaimer, the term of this patent is extended or adjusted under 35 U.S.C. 154(b) by 72 days.

(21) Appl. No.: 18/886,069

(22) Filed: Sep. 16, 2024

(65) Prior Publication Data

US 2026/0080006 A1     Mar. 19, 2026

(51) Int. Cl.
*G06F 16/487* (2019.01)

(52) U.S. Cl.
CPC .................................. *G06F 16/487* (2019.01)

(58) Field of Classification Search
CPC .... G06F 16/487; G06F 16/9535; G06F 40/56; G06F 40/58; H04L 67/306; G06Q 30/0276

USPC .......................................................... 709/217
See application file for complete search history.

(56) References Cited

U.S. PATENT DOCUMENTS

| | | | |
|---|---|---|---|
| 12,475,807 B1 * | 11/2025 | Ramnarine | G09B 7/06 |
| 2024/0427833 A1 * | 12/2024 | Kim | G06F 3/0483 |
| 2025/0200592 A1 * | 6/2025 | Kwittken | G06Q 30/0276 |
| 2025/0264937 A1 * | 8/2025 | Lau | G01S 19/14 |
| 2025/0278778 A1 * | 9/2025 | Park | H04L 67/306 |

FOREIGN PATENT DOCUMENTS

KR        20250150745 A  * 10/2025  ......... G06F 16/9535

* cited by examiner

*Primary Examiner* — Glenford J Madamba
(74) *Attorney, Agent, or Firm* — Bookoff McAndrews, PLLC

(57) ABSTRACT

A method for providing a customized content by an electronic device is provided The method includes: receiving a request to generate the customized content based on a target area and user information; acquiring a content related to the target area; classifying the content into multiple categories, each having a different criterion; determining at least one category among the multiple categories based on the user information; and providing a content included in the at least one determined category.

16 Claims, 18 Drawing Sheets

FIG. 2

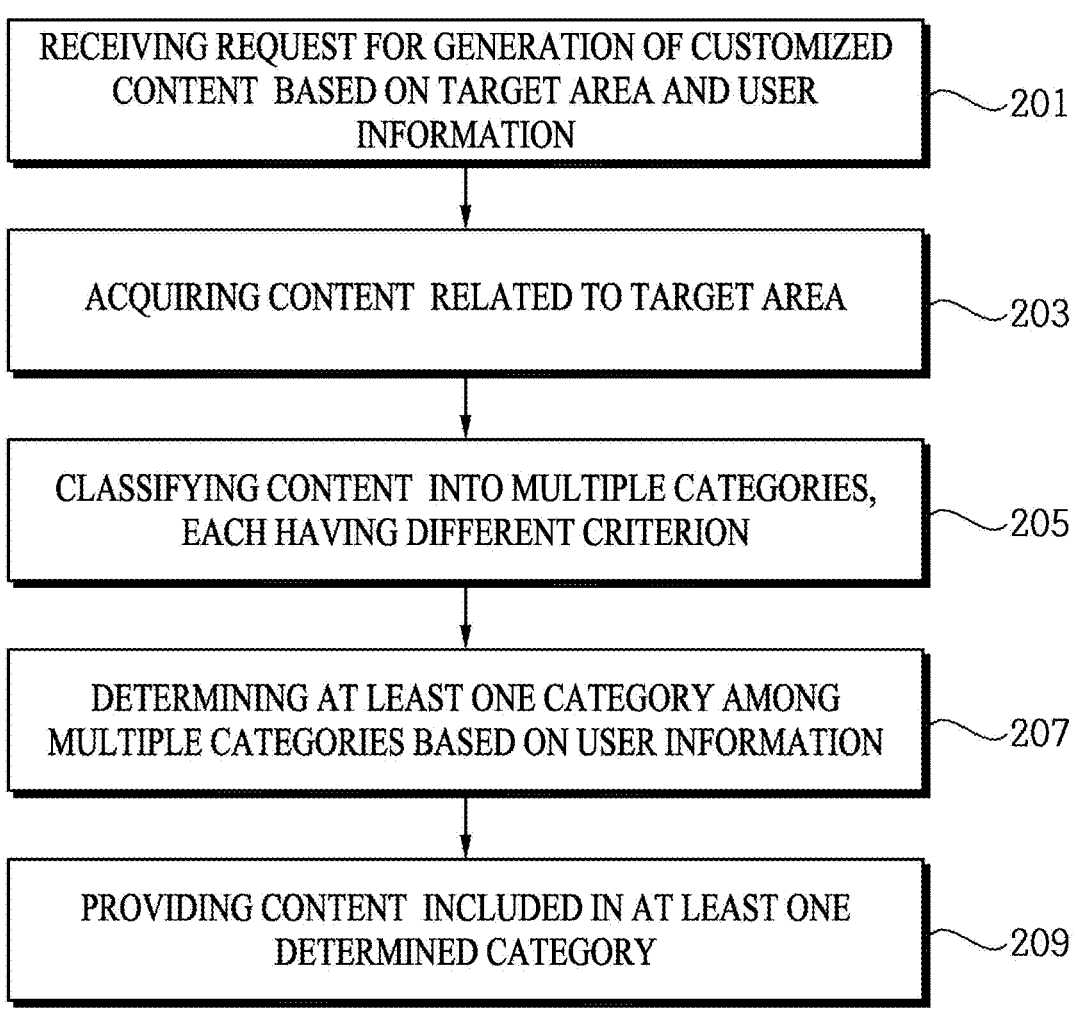

RECEIVING REQUEST FOR GENERATION OF CUSTOMIZED CONTENT BASED ON TARGET AREA AND USER INFORMATION ~201

ACQUIRING CONTENT RELATED TO TARGET AREA ~203

CLASSIFYING CONTENT INTO MULTIPLE CATEGORIES, EACH HAVING DIFFERENT CRITERION ~205

DETERMINING AT LEAST ONE CATEGORY AMONG MULTIPLE CATEGORIES BASED ON USER INFORMATION ~207

PROVIDING CONTENT INCLUDED IN AT LEAST ONE DETERMINED CATEGORY ~209

|  | First Persona | Second Persona |
|---|---|---|
| Age | 45 | 38 |
| Role | Regional Operations Manager who manages a real estate company with a diverse portfolio including hotels and residential properties | Principal architect and designer who provides expertise in design, architecture, and engineering services |
| Current Situation | Supervising a large customer service team across multiple regions, and ensuring brand standards for services and products | Leading a team of 12 architects, engineers, and interior designers, and providing real estate conceptualization and facade design |
| Interests and Goals | Aiming to maintain the highest level of customer satisfaction and brand loyalty while continuously improving operational efficiency | Striving to develop properties that evoke an emotional connection with residents and visitors |
| Obstacles | Managing a geographically dispersed team and balancing diverse needs of various customer groups (e.g., hotel guests, retail shoppers, residential tenants) requires adaptability and strategic planning | Customers often demand quick turnaround times, and there are regulatory barriers such as zoning laws, building codes, and other legal requirements |
| Personal Characteristics | Excellent interpersonal skills with the ability to make quick decisions under pressure | Excellent in fostering a collaborative environment and organizing open communication and idea exchange within the team |
| Professional Aspirations | Aspiring to be recognized as a leader in real estate investment and asset management by providing outstanding results and driving innovation | Aiming to be recognized as an architect and designer known for groundbreaking, innovative, and sustainable design |

FIG. 6

(ACB News)

"There's a famous saying that everything is bigger in Texas. However, the Texas hotel industry has changed since COVID-19."

⟶ Macro Industry Trend

- In an interview with ACB, Wilkins, the CEO of the architecture firm DEF, said that this situation could soon change.

- Wilkins highlighted an increased demand for travel safety among consumers following COVID-19, as well as a shift in strategies within the hotel industry due to the rise in remote workers.

⟶ Micro Industry Trend

-While Wilkins' recently announced project is currently undergoing the permitting process, groundbreaking may be postponed until the year after next due to delays in permits.

⟶ Development Pattern

(Photo of Burj Khalifa)

⟶ Correlation Threshold "0"

"We'll be seeing buildings of this height throughout the city. It wouldn't surprise us to hear more news," Wilkins said.

DEF expressed confidence that this building would become the most iconic building in Texas. However, it may not last long.

⟶ Correlation Threshold "0"

FIG. 7A

<Demographic Trends>

1. Environmental and Geographical Impact

Extreme weather conditions and increased environmental awareness significantly impact the demographic trends in San Antonio, which may affect local businesses, including the hotel industry.

2. Economic and Occupational Impact

Ongoing economic and employment changes in San Antonio are reshaping demographic trends, potentially influencing the clientele of local hotels.

3. Social and Political Impact

San Antonio's accommodation sector is navigating a complex web of demographic changes triggered by legislative, socio-economic, and health-related factors.

<Development Patterns>

1. Urban Development and Demographic Changes

Rapid urban development in San Antonio encompasses population shifts, real estate growth, and changes in land use patterns, reshaping the city's structure.

2. Impact of Social Changes on Urban Development

Data shows that social changes, such as health crises, cultural trends, economic shifts, and policy changes, influence urban development in San Antonio, affecting everything from commercial entertainment to residential patterns.

3. Changes in Building and Zoning Regulations

Recent changes in building and zoning regulations significantly impact San Antonio's urban development. These changes, influenced by political shifts, social trends, and environmental issues, are shaping the landscape of residential and commercial real estate, including hotels.

<Transportation>

1. Impact of Severe Weather on San Antonio's Recent severe weather has significantly affected San Antonio's transportation and related infrastructure, with important implications for city residents, businesses, and hotel operations.

2. Traffic Disruptions Due to Severe Weather Specific issues caused by severe weather are affecting urban transportation, including the use of electric scooters and river transportation, impacting the public and local businesses.

<Safety and Security>

1. Assessment of Crime and Safety Issues in the San

Based on recent crime reports, ongoing discussions about various safety and security issues in the San Antonio area emphasize the impact on local perception and the consequent issues for the hotel industry.

2. Evaluation of Local Crime Trends and Their Impact

Examining various aspects of crime trends in the San Antonio area and their impact on public safety perceptions, particularly concerning the hospitality industry.

3. Addressing Vehicle-Related Theft and Safety Issues

Focusing on the increasing trend of vehicle-related theft in San Antonio, including broader safety issues arising from such thefts, law enforcement interventions, and the impact on hospitality services.

FIG. 7B

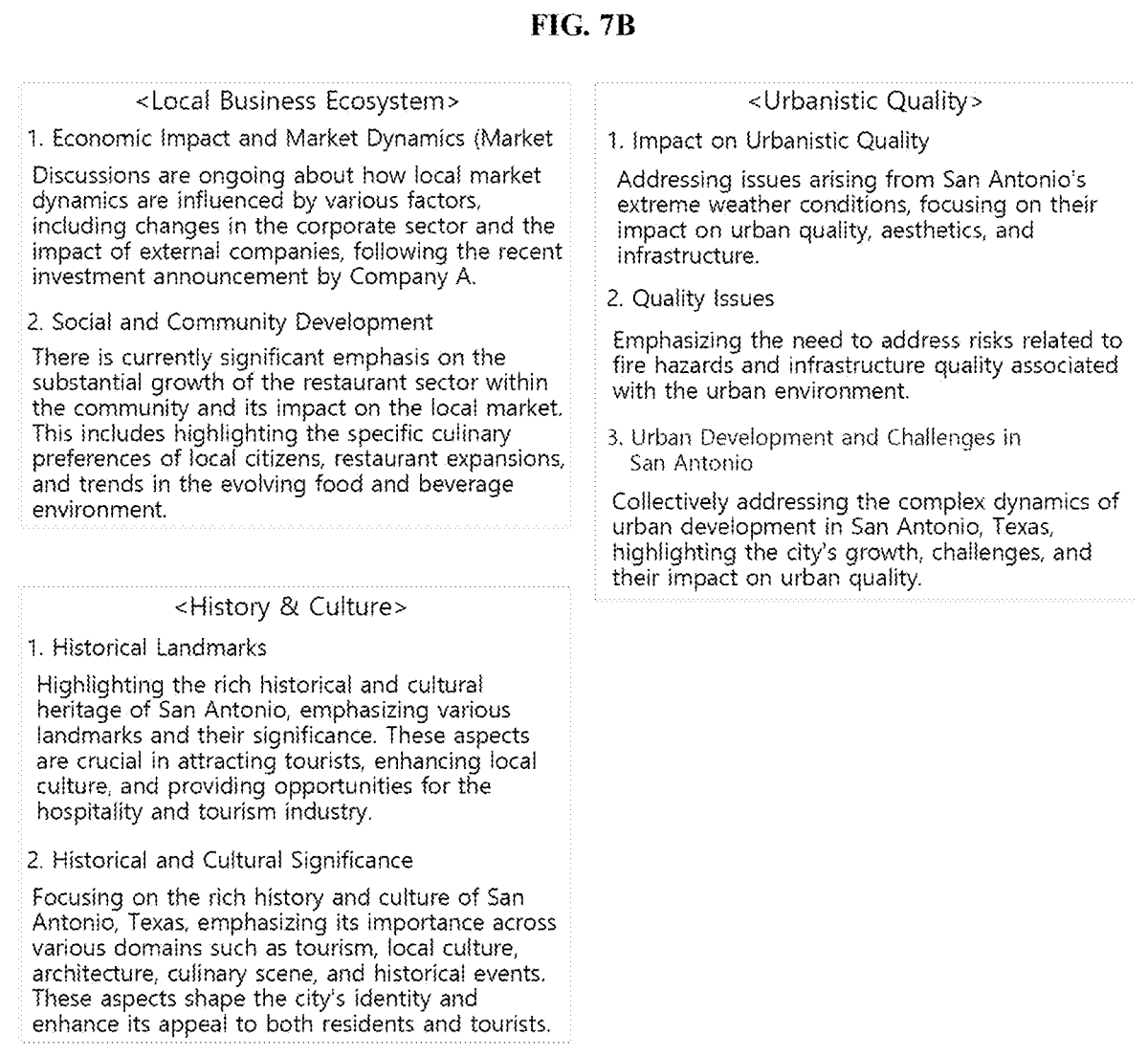

<Local Business Ecosystem>

1. Economic Impact and Market Dynamics (Market

Discussions are ongoing about how local market dynamics are influenced by various factors, including changes in the corporate sector and the impact of external companies, following the recent investment announcement by Company A.

2. Social and Community Development

There is currently significant emphasis on the substantial growth of the restaurant sector within the community and its impact on the local market. This includes highlighting the specific culinary preferences of local citizens, restaurant expansions, and trends in the evolving food and beverage environment.

<Urbanistic Quality>

1. Impact on Urbanistic Quality

Addressing issues arising from San Antonio's extreme weather conditions, focusing on their impact on urban quality, aesthetics, and infrastructure.

2. Quality Issues

Emphasizing the need to address risks related to fire hazards and infrastructure quality associated with the urban environment.

3. Urban Development and Challenges in San Antonio

Collectively addressing the complex dynamics of urban development in San Antonio, Texas, highlighting the city's growth, challenges, and their impact on urban quality.

<History & Culture>

1. Historical Landmarks

Highlighting the rich historical and cultural heritage of San Antonio, emphasizing various landmarks and their significance. These aspects are crucial in attracting tourists, enhancing local culture, and providing opportunities for the hospitality and tourism industry.

2. Historical and Cultural Significance

Focusing on the rich history and culture of San Antonio, Texas, emphasizing its importance across various domains such as tourism, local culture, architecture, culinary scene, and historical events. These aspects shape the city's identity and enhance its appeal to both residents and tourists.

FIG. 8

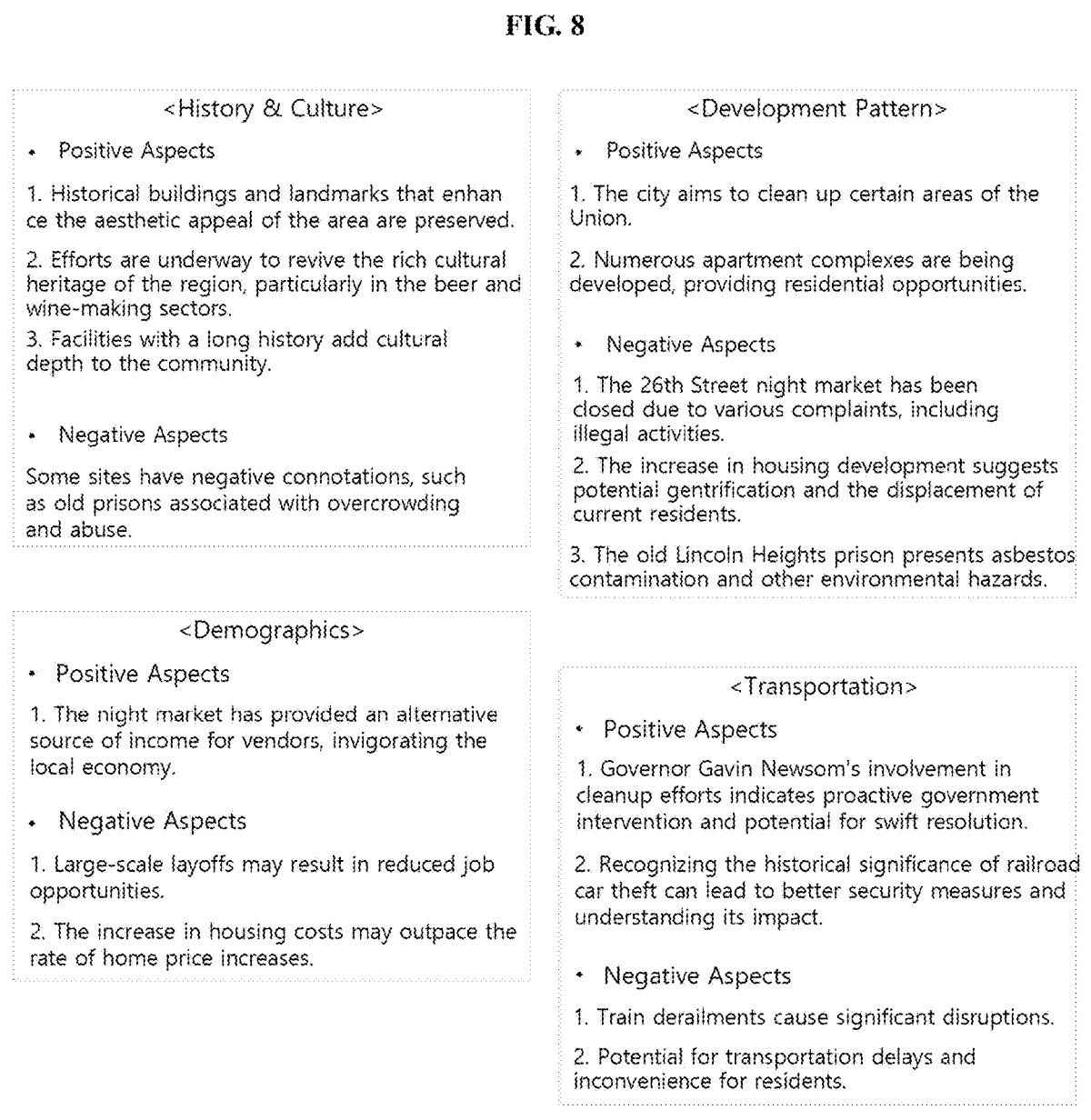

<History & Culture>

• Positive Aspects

1. Historical buildings and landmarks that enhance the aesthetic appeal of the area are preserved.

2. Efforts are underway to revive the rich cultural heritage of the region, particularly in the beer and wine-making sectors.
3. Facilities with a long history add cultural depth to the community.

• Negative Aspects

Some sites have negative connotations, such as old prisons associated with overcrowding and abuse.

<Development Pattern>

• Positive Aspects

1. The city aims to clean up certain areas of the Union.

2. Numerous apartment complexes are being developed, providing residential opportunities.

• Negative Aspects

1. The 26th Street night market has been closed due to various complaints, including illegal activities.

2. The increase in housing development suggests potential gentrification and the displacement of current residents.

3. The old Lincoln Heights prison presents asbestos contamination and other environmental hazards.

<Demographics>

• Positive Aspects

1. The night market has provided an alternative source of income for vendors, invigorating the local economy.

• Negative Aspects

1. Large-scale layoffs may result in reduced job opportunities.

2. The increase in housing costs may outpace the rate of home price increases.

<Transportation>

• Positive Aspects

1. Governor Gavin Newsom's involvement in cleanup efforts indicates proactive government intervention and potential for swift resolution.

2. Recognizing the historical significance of railroad car theft can lead to better security measures and understanding its impact.

• Negative Aspects

1. Train derailments cause significant disruptions.

2. Potential for transportation delays and inconvenience for residents.

FIG. 11

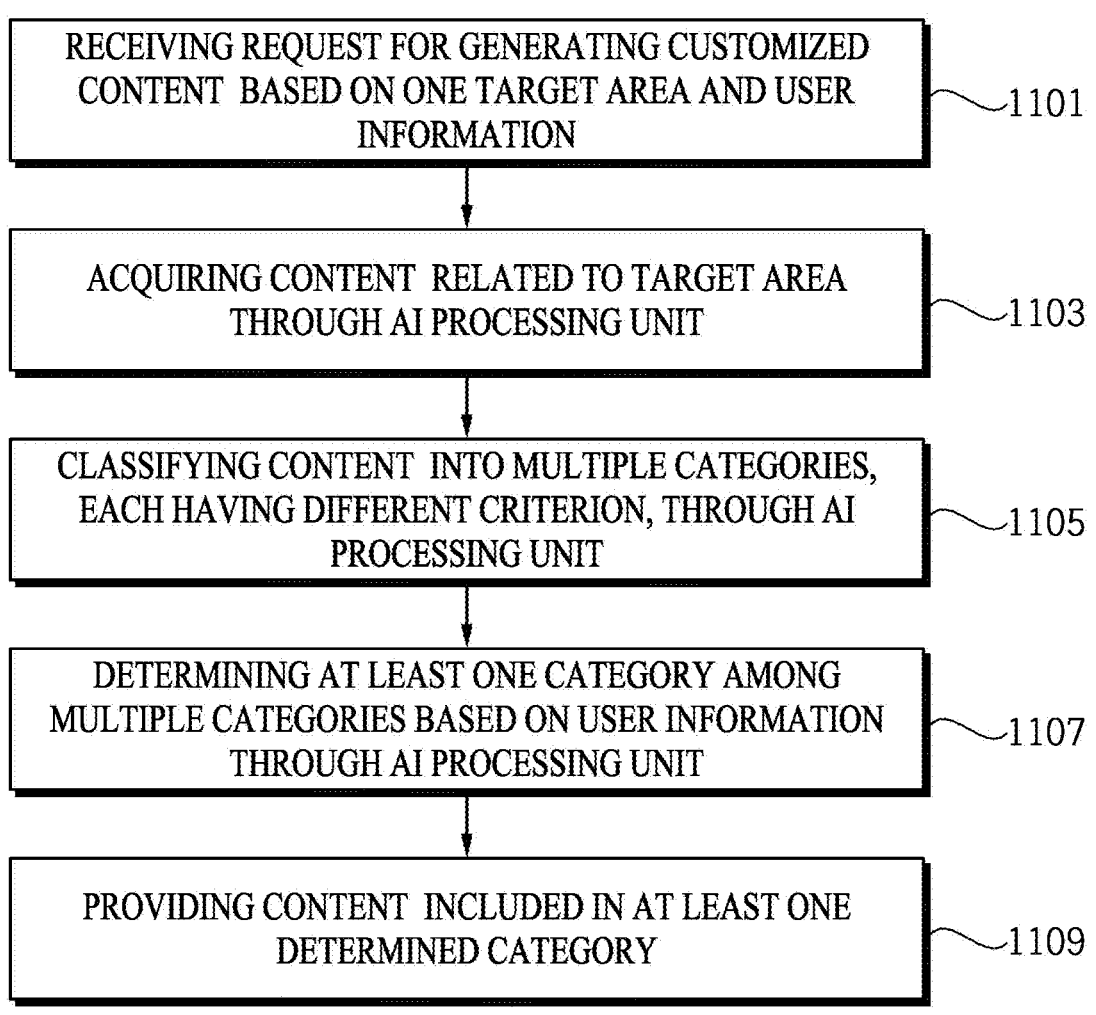

RECEIVING REQUEST FOR GENERATING CUSTOMIZED CONTENT BASED ON ONE TARGET AREA AND USER INFORMATION ~1101

ACQUIRING CONTENT RELATED TO TARGET AREA THROUGH AI PROCESSING UNIT ~1103

CLASSIFYING CONTENT INTO MULTIPLE CATEGORIES, EACH HAVING DIFFERENT CRITERION, THROUGH AI PROCESSING UNIT ~1105

DETERMINING AT LEAST ONE CATEGORY AMONG MULTIPLE CATEGORIES BASED ON USER INFORMATION THROUGH AI PROCESSING UNIT ~1107

PROVIDING CONTENT INCLUDED IN AT LEAST ONE DETERMINED CATEGORY ~1109

FIG. 12

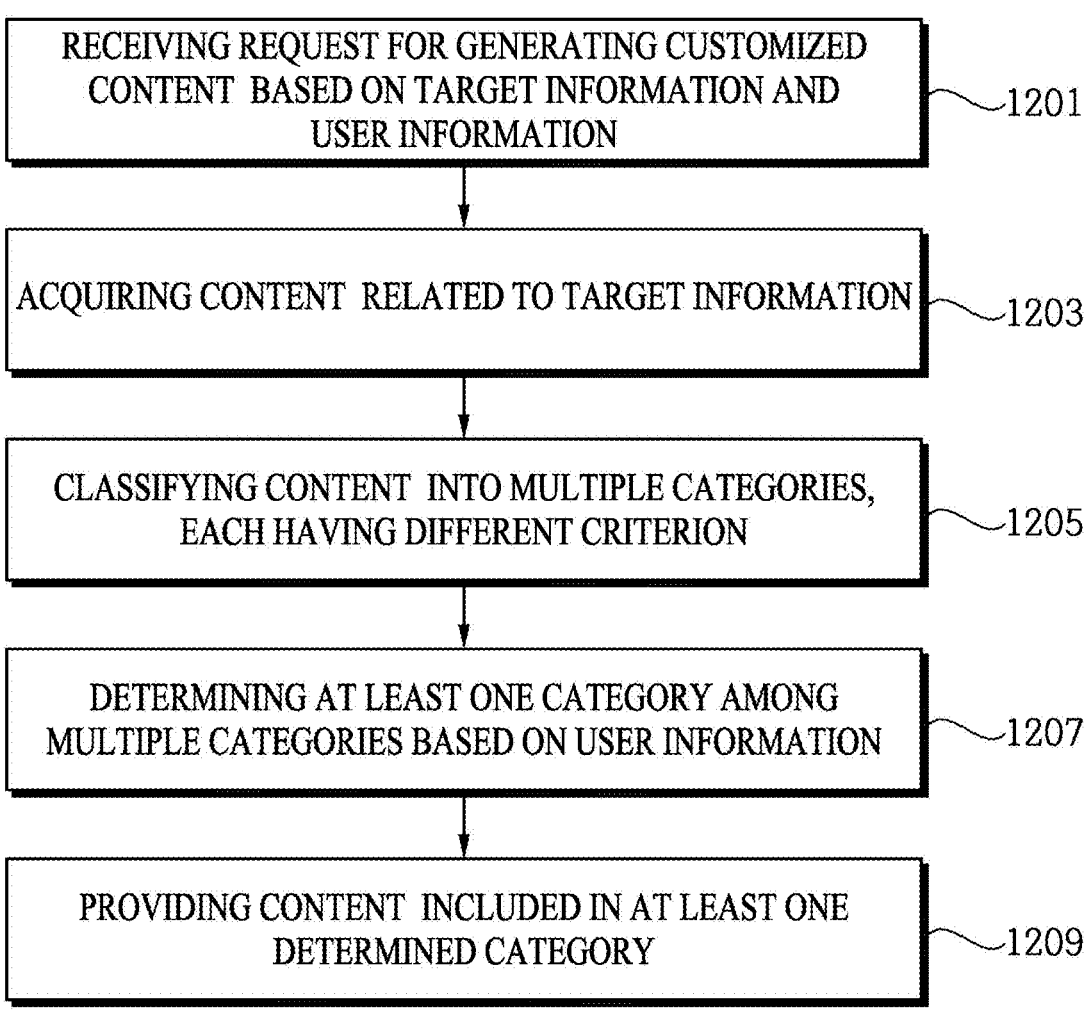

RECEIVING REQUEST FOR GENERATING CUSTOMIZED CONTENT BASED ON TARGET INFORMATION AND USER INFORMATION ~1201

ACQUIRING CONTENT RELATED TO TARGET INFORMATION ~1203

CLASSIFYING CONTENT INTO MULTIPLE CATEGORIES, EACH HAVING DIFFERENT CRITERION ~1205

DETERMINING AT LEAST ONE CATEGORY AMONG MULTIPLE CATEGORIES BASED ON USER INFORMATION ~1207

PROVIDING CONTENT INCLUDED IN AT LEAST ONE DETERMINED CATEGORY ~1209

METHOD FOR PROVIDING CUSTOMIZED CONTENT AND ELECTRONIC DEVICE SUPPORTING THE SAME

BACKGROUND

Technical Field

The present disclosure relates to a method of providing a customized content using artificial intelligence (AI) technology and an electronic device that supports the same.

Description of Related Technology

With the advancement in artificial intelligence (AI), various fields are applying AI technology. One example of applied AI technology is machine learning, where computer systems learn and recognize patterns based on content. Another example is deep learning, which utilizes artificial neural networks, multi-layered structures, to learn from a large amount of content and extract complex patterns. This deep learning, an algorithmic technique for autonomously classifying and learning the features of input content, is widely used in tasks such as image and voice recognition, and natural language processing.

Other examples of applied AI technology include: natural language processing (NLP) of performing tasks such as text analysis, sentence generation, machine translation, sentiment analysis, and speech recognition; neuromorphic computing; and statistical machine learning. However, various AI technologies, such as machine learning, do not effectively utilize these techniques for content collection, classification, and application to enhance the electronic devices'efficient resource use or improve content management.

SUMMARY

The present disclosure relates to a method of providing a customized content using artificial intelligence (AI) technology and an electronic device supporting the same.

In one general aspect, there is provided a method for providing a customized content by an electronic device, the method including: receiving a request to generate the customized content based on a target area and user information; acquiring a content related to the target area; classifying the content into multiple categories, each having a different criterion; determining at least one category among the multiple categories based on the user information; and providing a content included in the at least one determined category.

The method may further include: generating prompting information requesting generation of persona information corresponding to the user information; transmitting the generated prompting information to an artificial intelligence (AI) server; receiving a result code from the AI server; and identifying the generated persona information based on the received result code.

The persona information may include at least one of the following: age information, role information, current situation information, interests and goals information, obstacles information, personal characteristics information, and professional aspirations information of a user who has requested the generation of the customized content.

The acquiring of a content related to the target area may include acquiring at least one content based on at least one of the following: keyword information related to the target area, year information for content search, and link information for content search.

The acquiring of a content related to the target area may further include: generating prompting information requesting verification of a content that exceeds a preset correlation threshold among the at least one content; transmitting the generated prompting information to an artificial intelligence (AI) server; receiving a result code from the AI server; and based on the received result code, identifying a content exceeding the preset correlation threshold.

The generating of prompting information may include generating prompting information for evaluating a correlation threshold of the at least one content based on at least one of location information and name information of the target area.

The determining of at least one category among the multiple categories based on the user information may include: determining a persona group related to the persona information among a plurality of preset persona groups; and identifying the at least one determined category corresponding to the determined persona group, The determining of at least one category among the multiple categories based on the user information may include: generating prompting information requesting identification of at least one category related to the persona information among the multiple categories; transmitting the generated prompting information to the AI server; receiving a result code from the AI server; and identifying the at least one determined category, based on the received result code.

The providing of a content included in the at least one determined category may further include providing, at a preset interval, the content included in the at least one determined category to a terminal of the user.

The method may further include: receiving feedback information regarding the content included in the at least one determined category from the user; and transmitting the received feedback information to an AI server as training data for generating a customized content.

In another aspect, there is provided an electronic device providing a customized content, the electronic device including: a memory storing instructions, and a processor configured to execute the instructions to: receive a request to generate the customized content based on a target area and user information; acquire a content related to the target area; classify the content into multiple categories, each having a different criterion; determine at least one category among the multiple categories based on the user information; and provide a content included in the at least one determined category.

The processor may generate prompting information requesting generation of persona information corresponding to the user information, transmit the generated prompting information to an artificial intelligence (AI) server, receive a result code from the AI server, and identify the generated persona information based on the received result code.

The processor may acquire at least one content based on at least one of the following: keyword information related to the target area, year information for content search, and link information for content search.

The processor may generate prompting information requesting verification of a content exceeding a preset correlation threshold among the at least one content, transmit the generated prompting information to an artificial intelligence (AI) server, receive a result code from the AI server, and based on the received result code, identify a content exceeding the preset correlation threshold.

The processor may generate prompting information for evaluating a correlation threshold of the at least one content based on at least one of location information and name information of the target area.

The processor may determine a persona group related to the persona information among a plurality of preset persona groups, and identify the at least one determined category corresponding to the determined persona group.

The processor may generate prompting information requesting selection of the at least one determined category corresponding to the persona information among the multiple categories, transmit the generated prompting information to the AI server, receive a result code from an intelligent server, and identify the at least one determined category based on the received result code.

The processor may provide, at a preset interval, the content included in the at least one determined category to a terminal of the user.

The processor may receive feedback information regarding the content included in the at least one determined category from the user, and transmit the received feedback information to an AI server as training data for generating a customized content.

BRIEF DESCRIPTION OF THE DRAWINGS

FIG. 2 is a flowchart illustrating a process in which an electronic device provides a customized content using artificial intelligence (AI) technology according to an embodiment of the present disclosure.

FIG. 4 is a diagram illustrating an example of persona information generated using AI technology based on user information according to an embodiment of the present disclosure.

FIG. 6 is a diagram illustrating an example in which an electronic device classifies a content related to a target area into categories according to various embodiments of the present disclosure.

FIGS. 7A and 7B are diagrams illustrating an example of a customized content according to an embodiment of the present disclosure.

FIG. 8 is a diagram illustrating an example of a customized content according to an embodiment of the present disclosure.

FIG. 11 is a diagram illustrating an example in which an electronic device provides a customized content using AI technology according to an embodiment of the present disclosure.

FIG. 12 is a diagram illustrating another example in which an electronic device provides a customized content using AI technology according to an embodiment of the present disclosure.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

As used herein, the singular forms "a", "an," and "the" are intended to include the plural forms as well, unless the context clearly indicates otherwise.

In this application, the described steps may be carried out in any sequence, except in cases where a clearly defined cause-and-effect relationship necessitates a specific order.

It will be further understood that the terms "comprise," "include," "have," etc. when used in this specification, specify the presence of stated features, integers, steps, operations, elements, components, and/or combinations of them but do not preclude the presence or addition of one or more other features, integers, steps, operations, elements, components, and/or combinations thereof.

According to various embodiments of the present disclosure, AI technology may refer to AI itself or a technology for researching the methodology to create AI. Machine learning, which is an example of the AI technology, may be an algorithmic technology in which a computer system automatically learns from content and recognizes patterns to make decisions or make predictions. Machine learning involves building models based on content and making predictions or decisions on new content using the models.

Figure 1:
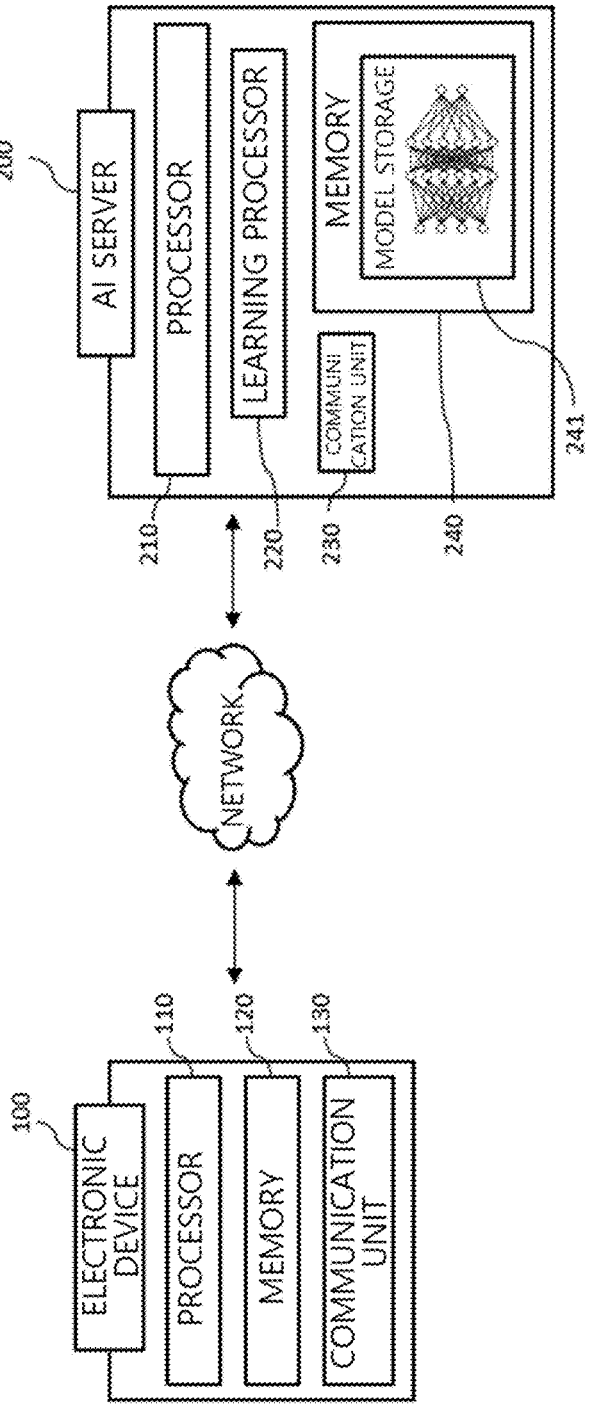
FIG. 1 is a diagram illustrating an example of a network environment according to an embodiment of the present disclosure.

FIG. 1 is a diagram illustrating an example of a network environment according to an embodiment of the present disclosure.

Hereinafter, the present disclosure will be described with reference to the attached drawings.

According to various embodiments of the present disclosure, an electronic device 100 may be connected to an AI server 200 through a network. Communication schemes for a network are not limited. The communication schemes may include not only a communication scheme to utilize a telecommunication network (for example, a mobile communication network, wired Internet, wireless Internet, and a broadcast network), but also a short-range radio communication scheme.

According to various embodiments of the present disclosure, the electronic device 100 may be implemented as a computer device or a plurality of computer devices providing commands, codes, files, content, services, etc. For convenience of explanation, the electronic device 100 has been described as a single electronic device. However, the electronic device 100 may be composed of a plurality of electronic devices providing different functions or services.

According to various embodiments of the present disclosure, the electronic device 100 may include at least one of the following: a smartphone, a tablet personal computer (tablet PC), a mobile phone, a video phone, an e-book reader, a desktop personal computer (desktop PC), a laptop personal computer (laptop PC), a netbook computer, a workstation, a server, a personal digital assistant (PDA), a portable multimedia player (PMP), an MP3 player, a mobile medical device, a camera, and a wearable device.

According to various embodiments of the present disclosure, when the electronic device 100 needs to perform a specific function or service automatically or upon a user's request, the electronic device 100 may request at least some associated functions from an external server, instead of or in addition to executing the specific function or service itself. The electronic device 100 may provide the requested function or service by processing a received result from an external server as-is or additionally. For example, cloud computing, distributed computing, or client-server computing technologies may be employed.

Referring to FIG. 1, the electronic device 100 may include a processor 110, a memory 120, and a communication interface 130.

In one embodiment, at least one of the components of the electronic device 100 may be omitted or another component may be additionally provided. For example, the electronic device 100 may additionally be provided with an input unit that serves as an interface for delivering commands or content input from the user or other external devices to other components of the electronic device 100. In another example, the electronic device 100 may be provided with an output unit such as a display, a touchscreen, a speaker, a vibration generator, and a haptic feedback generator. In yet another example, the electronic device 100 may include an operating system for controlling resources related to the electronic device 100 and/or various applications running on the operating system. For instance, the electronic device 100 may include one or more applications capable of performing functions such as home, dialer, short message service (SMS)/multimedia messaging service (MMS), browser, camera, calendar, and more.

The processor 110 may control the overall operation of the memory 120 and the communication interface 130. According to various embodiments of the present disclosure, the memory 120 may function as a storage medium capable of storing multiple applications running on the electronic device 100, as well as content and commands required for the operation of the electronic device 100. In one embodiment, the memory 120 may be provided in the form of any of various hardware storage devices such as a read-only memory (ROM), a random-access memory (RAM), a flash drive, a hard drive, etc., or may be provided in the form of web storage. The communication interface 130 may communicate with the electronic device 100 over a network in a wired or wireless manner.

According to various embodiments, the processor 110 may receive a request to generate a customized content based on a target area and user information.

In one embodiment, the processor 110 may receive information on a target area for generating a customized content through a user input. In another embodiment, the processor 110 may receive the information on the target area for generating a customized content from an external electronic device (e.g., an external server, external terminal, etc.).

Here, the term "target area" may refer to a physical area for generating a customized content. For example, the target area may include a state, county, city, town, village, specific region (e.g., urban area, residential area, industrial park, coastal area, suburban area, and administrative unit in South Korea such as do, si, gun, gu, eup, myeon, dong, and ri), specific address, etc.

According to various embodiments, the processor 110 may acquire at least one content based on the target area.

The processor 110 may acquire content s such as external expert content providers' content (e.g., Deloitte® real estate content, KPMG® real estate content, etc.), commercial real estate information companies' content (e.g., CoStar® commercial real estate information company), legal regulation content for the target area (e.g., Gangnam-gu ordinances, South Korean laws, California state laws, federal laws, San Antonio, Texas ordinances, etc.), news content (e.g., CNN®, USA Today®), and local publication content (e.g., local newspapers, Texas Monthly®, San Antonio Express News®, etc.).

For example, the processor 110 may request a content related to the target area from each external server and receive various content s from the respective external servers to store in the memory 120. In another example, the processor 110 may request various content s from the respective companies, and the received content s may be separately stored in the memory 120 by the operator of the electronic device 100.

In one embodiment, the processor 110 may assign a correlation value to information included in each of the content s received from external servers, etc., based on a preset correlation measurement function. Here, the preset correlation measurement function is a function that quantifies the connectivity between contents, and may serve as a criterion function for evaluating a correlation between the target area and each content acquired from external sources.

For example, the preset correlation measurement function may be a function that determines the correlation level of a content (e.g., CNN content, expert reports, etc.) relative to a target area (e.g., a specific site in Texas) for inclusion in a customized content. The preset correlation measurement function may include a correlation measurement analysis criterion for performing matching degree evaluation, which directly evaluates a correlation of a content with a target area and evaluation of variables and keywords within a content set.

In an additional example, the processor 110 may generate prompting information requesting evaluation of a correlation of a content related to the target area. The processor 110 may transmit the generated prompting information to an artificial intelligence (AI) server 200 and receive a result code from the AI server 200. Based on the received result code, the processor 110 may assign a correlation value to each piece of information contained in each content.

According to various embodiments of the present disclosure, the processor 110 may verify a content whose correlation value exceeds a preset correlation threshold among content s with assigned correlation values. For example, the processor 110 may identify a correlation value (e.g., '0,' '1,' '2,' '3,' or 'low,' 'medium,' 'high,' etc.) for each acquired content (e.g., qualitative content and quantitative content). The processor 110 may classify information corresponding to a content exceeding the preset correlation threshold into multiple categories, each having a different analysis criterion. For example, if the preset correlation threshold is '0' or 'low,' the processor 110 may extract a content with a correlation value exceeding '0' or 'low.' In another example, if the preset correlation threshold is '1' or 'medium,' the processor 110 may extract a content with a correlation value exceeding '1' or 'medium.'

In one embodiment, the processor 110 may receive user information for generating a customized content through a user input. In another embodiment, the processor 110 may receive user information from an external electronic device (e.g., an external server, external terminal, etc.) to generate a customized content. Here, the user information may include characteristic information about a different entity for each user who requests the generation of a customized content.

In one embodiment, the user information may be determined based on queries and answers provided via the processor 110. For example, the queries provided via the processor 110 may include expert background queries, task and requirement queries, goals and aspirations queries, personal characteristics and approach queries, and feedback queries. The expert background queries may include queries about a user's expertise, such as 'What is your current role and what are your main responsibilities in your organization?' and "How many years of experience do you have in this field, and what are your company's primary interests?'. The task and requirement queries may include queries about the issues the user faces, such as 'What are the most important challenges you encounter in your daily work?' and 'What tools or resources might help you overcome these challenges?'. The goals and aspirations queries may include queries about the user's future plans, such as 'What are your main goals for the next year and for the long term?' and 'What skills or knowledge do you aim to acquire to advance your career?'. The personal characteristics and approach queries may include queries designed to identify each user's unique traits, such as 'What is your work style and which personal strengths do you rely on most?' and 'What is your philosophy regarding your profession?'. The feedback queries may include queries about the various tools the user uses, such as 'What features do you find most valuable in the tools you currently use, and what features do you think are missing?'.

According to various embodiments, the processor 110 may generate persona information corresponding to user information based on the user information. The processor 110 may generate prompting information requesting the generation of persona information corresponding to the user information. Here, the prompting information may be a text, question, or information input to be transmitted to the AI server 200 by the processor 110. For example, through the prompting information, the processor 110 may provide the AI server 200 with a starting point for a desired task or question and receive a response from the AI server 200.

The processor 110 may transmit the prompting information to the AI server 200. The processor 110 may receive a result code from the AI server 200. Based on the received result code, the processor 110 may identify the generated persona information. Here, the persona information may be information that determines the unique characteristics of each user based on answers to expert background queries, task and requirement queries, goals and aspirations queries, personal characteristics and approach queries, feedback queries, and so on, which are provided via the processor 110. For example, if the answers of a first user and a second user to a query provided via the processor 110 differ, the persona information generated for the first user and the second user using AI technology may also differ.

According to various embodiments, the processor 110 may classify a content related to a target area into multiple categories, each having a different criterion. Here, the content related to the target area may be a content that exceeds a preset correlation threshold.

In one embodiment, the content related to the target area may include a quantitative content and a qualitative content. Here, a quantitative content related to a target area may include at least one of a population density content, an economic indicator content, a traffic statistics content, an architectural infrastructure content, and an environmental content related to the target area (e.g., a specific site, a specific section, etc.). The population density content may include information on how densely populated the target area is. The economic indicator content may include information on income levels, employment rates, industry structure, and consumption patterns within the target area. The traffic statistics content may include information on vehicle flow, public transportation usage rates, traffic accident statistics, and the efficiency of the transportation network around the target area. The architectural infrastructure content may include information on the number of buildings, building types, materials, construction year, and energy efficiency in the target area. The environmental content may include information on climate change, environmental pollution, and biodiversity in the target area.

In one embodiment, a qualitative content related to a target area may include at least one of the following: a social media (SNS) content related to a target area (e.g., a specific site, a specific section, etc.), a local community feedback content, a cultural value content, and a quality of life content. Here, the SNS content may include a positive or negative content, a preference content, and an opinion content related to the target area. The local community feedback content may include information about the building needs and expectations of residents near the target area. The cultural value content may include information on the history, traditions, and arts related to the target area. The quality of life content may include information on the residential environment, education, health, safety, and recreational activities in the target area.

According to various embodiments of the present disclosure, after acquiring a content related to a target area, the processor 110 may structure the content into an analyzable format. For example, the processor 110 may structure the acquired content into an analyzable format through a content refinement process (e.g., content duplication checking, content error checking, content anomaly detection, etc.), content transformation process (e.g., content format conversion, content integration, content segmentation, etc.), and a content structuring process (e.g., organizing into tables, lists, etc.).

In one embodiment, the processor 110 may collect a content related to a target area using AI technology. The processor 110 may structure the content collected through AI technology (e.g., a qualitative content and/or a quantitative content) into an analyzable format.

According to various embodiments of the present disclosure, the processor 110 may classify at least part of the information included in a content into multiple categories, each having a different criterion. According to various embodiments, the processor 110 may classify a content related to a target area into the multiple categories based on at least part of information included in the content (e.g., information that exceeds a preset correlation threshold).

Here, the multiple categories may be categories into which a content related to the target area is classified based on different criteria. For example, the categories may include at least two of the following categories: 'Macro Industry Trend', 'Micro Industry Trend', 'Demographic Trend', 'Development Pattern', 'Transportation', 'Safety and Security', 'Local Business Ecosystem', 'History & Culture', and 'Urbanistic Quality'. According to various embodiments of the present disclosure, depending on a target area, at least some of the aforementioned categories may be omitted or other categories may be additionally included.

The 'Macro Industry Trend' category may be a category related to industry changes at national, regional, or district levels, hospitality changes, policy changes, etc. The 'Macro Industry Trend' category may be comprised of topics including: Customer Experience Enhancement; Health, Safety, and Sustainability; Strategic Market Analysis; Marketing and Engagement; Operational and Business Efficiency; Innovation and Technology; and Design and Quality Assurance. For instance, the processor 110 may provide functionalities to allocate information included in a content according to each specific topic included in the 'Macro Industry Trend' category. In the above example, information "A" included in a real estate expert report content may be allocated to the topic of 'Marketing and Engagement', while information "B" may be allocated to the topic of 'Innovation and Technology.'

The 'Micro Industry Trend' category may be a category related to a specific industry, a specific district, specific real estates, or a specific project. The 'Micro Industry Trend' category may be comprised of topics including: Market Dynamics and Industry Analysis; Impact of External Factors on Hospitality; Tourism Trends and Attractions; Innovation and Trends in Hospitality; Event-Driven Hospitality Demand; Customer Preferences and Services; Food & Beverage Strategy; Environmental Awareness and Sustainability; Community and Cultural Engagement; and Crisis Management and Contingency. For example, the processor 110 may provide functionalities to allocate information included in a content according to each specific topic included in the 'Micro Industry Trend' category. In the above example, information "A" included in a news content may be allocated to the topic of 'Customer Preferences and Services', while information "B" may be allocated to the topic of 'Community and Cultural Engagement.'

The 'Demographic Trend' category may be a category related to census, demography, population age, population sex ratio, migration patterns, etc. The 'Demographic Trend' category may be comprised of topics including: Demographic Changes and Population Dynamics; Urban Development and Local Economy; Population Growth and Its Implications; and Changes in Industry and Services. For example, the processor 110 may provide functionalities to allocate information included in a content according to each specific topic included in the 'Demographic Trend' category. In the above example, information "A" included in local newspapers (e.g., New York Times, Gangnam-gu Newspaper) may be allocated to the topic of 'Demographic Changes and Population Dynamics', while information "B" may be allocated to the topic of 'Urban Development and Local Economy.'

The 'Development Pattern' category may be a category related to residential, commercial, infrastructure development, environmental conservation, etc. of an area, section, or site. The 'Development Pattern' category may be comprised of topics including: Urban Development and Planning; Economic and Business Dynamics; Infrastructure and Community Development; Social and Community Concerns; and Specific Industry Focus. For example, the processor 110 may provide functionalities to allocate information included in a content according to each specific topic included in the 'Development Pattern' category. In the above example, information "A" included in a local newspaper (e.g., New York Times, Gangnam-gu Newspaper) may be allocated to the topic of 'Urban Development and Planning', while information "B" may be allocated to the topic of 'Social and Community Concerns'.

The 'Transportation' category may be a category related to transportation systems, development of transportation modes (e.g., roads, railways, airports), etc. of an area, section, or site. The 'Transportation' category may be composed of topics including: Weather and Environmental Impacts on 'Transportation"; Infrastructure and Regulatory Influences; Social and Economic Factors; Urban Planning and City Dynamics; Security and Law Enforcement; and Adaptation and Response to Change. For example, the processor 110 may provide functionalities to allocate information included in a content according to each specific topic included in the 'Transportation' category. In the above example, information "A" included in legal regulations (e.g., San Antonio ordinances in Texas, Gangnam-gu ordinances in South Korea, federal laws, state laws, etc.) may be allocated to the topic of 'Infrastructure and Regulatory Influences', while information "B" may be allocated to the topic of 'Urban Planning and City Dynamics'.

The 'Safety and Security' category may be a category related to crime rates, public safety, etc. of an area, section, or site. The 'Safety and Security' category may be comprised of topics including: Crime and Public Safety; Public Health and Safety; Mass Gatherings and Event Safety; and Emergency Situations and Disaster Response. For example, the processor 110 may provide functionalities to allocate information included in a content according to each specific topic included in the 'Safety and Security' category. In the above example, information "A" included in the news may be allocated to the topic of 'Crime and Public Safety,' while information "B" may be allocated to the topic of 'Emergency Situations and Disaster Response.'

The 'Local Business Ecosystem' category may be a category related to business environment, corporate ecosystem, startup ecosystem, etc. of an area, section, or site. The 'Local Business Ecosystem' category may be comprised of topics including: Economic Impact and Market Dynamics; Social and Community Development; Environmental and Regulatory Factors; and Luxury and High-End Market Focus. For example, the processor 110 may provide functionalities to allocate information included in a content according to each specific topic included in the 'Local Business Ecosystem' category. In the above example, information "A" included in the news may be allocated to the topic of 'Economic Impact and Market Dynamics', while information "B" may be allocated to the topic of 'Luxury and High-End Market Focus.'

The 'History & Culture' category may be a category related to history, culture, arts, heritage, etc. of an area, section, or site. The 'History & Culture' category may be comprised of topics including: Historical Significance; Heritage and Landmarks; Cultural Impact; Community Identity and Events; and Economic, Socio-Economic Factors and Business Dynamics. For example, the processor 110 may provide functionalities to allocate information included in a content according to each specific topic included in the 'History & Culture' category. In the above example, information "A" included in the news may be allocated to the topic of 'Historical Significance', while information "B" may be allocated to the topic of 'Community Identity and Events'.

The 'Urbanistic Quality' category may be a category related to residential environment, education, healthcare, cultural facilities, environmental sustainability, etc. in an area, section, or site. The 'Urbanistic Quality' category may be comprised of topics including: Urban Development and Infrastructure; Cultural, Historical, and Community Dynamics; Tourism, Attractions, and Urban Lifestyle; Residential and Economic Impact; Urban Image; and Investment and Health Concerns. For example, the processor 110 may provide functionalities to allocate information included in a content according to each specific topic included in the 'Urbanistic Quality' category. In the above example, information "A" included in the news may be allocated to the topic of 'Urban Development and Infrastructure', while information "B" may be allocated to the topic of 'Investment and Health Concerns'.

According to various embodiments, the processor 110 may determine at least one category among the multiple categories based on user information. In one embodiment, the processor 110 may determine a category corresponding to persona information. For example, among the multiple categories, the first persona information may be determined to correspond to the 'Local Business Ecosystem' and 'History & Culture' categories; the second persona information may be determined to correspond to the 'Transportation' and 'Safety and Security' categories; and the third persona information may be determined to correspond to the 'Macro Industry Trend' and 'Local Business Ecosystem' categories.

According to various embodiments, the processor 110 may provide a content included in at least one determined category. In one embodiment, the processor 110 may provide a user with a content included in a category that is determined based on persona information. For example, a content (e.g., CNN news content) included in the 'Local Business Ecosystem' and 'History & Culture' categories may be provided to a first user (e.g., an external terminal or external server corresponding to the first user). In addition, a content (e.g., Deloitte® real estate content, KPMG® real estate content) included in the 'Transportation' and 'Safety and Security' categories may be provided to a second user (e.g., an external terminal or external server corresponding to the second user).

According to various embodiments, the AI server 200 may include a processor 210, a learning processor 220, a communication interface 230, and a memory 240. In one embodiment, the AI server 200 may refer to a device that trains an artificial neural network using a machine learning algorithm or utilizes a trained artificial neural network. Here, the AI server 200 may not include at least one of the components of the AI server 200 shown in FIG. 1 or may additionally include another component. The AI server 200 may include a plurality of servers to perform distributed processing, and the functionalities of the AI server 200 may be included as part of the configuration of the electronic device 100 or an external server.

According to various embodiments, the processor 210 may infer a result value for a new input content using a trained model, and generate a response or control command based on the inferred result value.

According to various embodiments, the learning processor 220 may train an artificial neural network using a training content. Here, the trained model may be used on the AI server 200 of the artificial neural network or may be used on an external device such as the electronic device 100 and an external server. In one embodiment, the trained model, which is a detection model trained based on artificial intelligence, may be a model based on a neural network. In one embodiment, an object detection model may be designed to simulate the structure of the human brain on a computer and may include multiple network nodes with weights, the nodes which simulate neurons in the human nervous system.

According to various embodiments, the multiple network nodes may form a connection relationship to simulate synaptic activities of neurons that transmit signals through synapses. In one embodiment, the object detection model may include a neural network model or a deep learning model evolved from the neural network model. In the deep learning model, the multiple network nodes may exchange content s based on convolutional connection relationships while positioned in different layers. For example, the object detection model may include deep neural network (DNN), recurrent neural network (RNN), bidirectional recurrent deep neural network (BRDNN), etc.

The communication interface 230 may establish communication between the electronic device 100 and an external electronic device. For example, the communication interface 230 may be connected to a network through wireless or wired communication to communicate with an external electronic device (e.g., an external server), the electronic device 100, etc.

According to various embodiments, the memory 240 may include a model storage 241. The model storage 241 may store a model that is being trained or has been trained through the learning processor 220. Here, the trained model may be implemented in hardware, software, or a combination of hardware and software. When the entire or part of the trained model is implemented as software, one or more instructions constituting the trained model may be stored in the memory 240.

According to various embodiments of the present disclosure, the model storage 241 may include an artificial neural network (ANN). In one embodiment, the ANN, which is a model used in artificial neural network machine learning, may refer to a model composed of artificial neurons forming a network through the combination of synapses. Here, the ANN may be defined by connection patterns between neurons in different layers, a learning process for updating model parameters, and an activation function for generating output values.

According to various embodiments, the ANN may include an input layer, an output layer, and optionally at least one hidden layer. In one embodiment, each layer may include one or more nodes, and the ANN may include synapses connecting nodes to each other. In the ANN, each node may output a functional value of an activation function for input signals, weights, and biases received through synapses.

According to various embodiments, model parameters may refer to parameters determined through learning, and may include weights of synaptic connections and biases of neurons. In one embodiment, hyperparameters may refer to parameters that need to be set before learning in a machine learning algorithm, and may include a learning rate, the number of iterations, a mini-batch size, an initialization function, etc.

According to various embodiments, the purpose of training an artificial learning network may be to determine model parameters that minimize a loss function. Here, the loss function may be used as a metric to determine optimal model parameters during the learning process of an artificial neural network. Machine learning may be classified into supervised learning, unsupervised learning, and reinforcement learning based on the learning methods.

According to various embodiments, the supervised learning may refer to a method of training an artificial neural network given a label for a training content. Here, the label may refer to an output value that an artificial neural network should infer when the training content is input to the artificial neural network. In one embodiment, the unsupervised learning may refer to training an artificial neural network without a labeled training content. In one embodiment, the reinforcement learning may refer to a learning method where an agent defined within a certain environment is trained to select actions maximizing cumulative rewards in each state, or a sequence of the actions.

According to various embodiments, the AI server 200 may utilize quantum computing technology. Here, the quantum computing technology refers to the use of qubits to perform parallel computations by leveraging quantum mechanical properties such as superposition, quantum entanglement, and quantum decoherence, allowing qubits to exist in states of both 0 and 1 simultaneously. For example, the AI server 200 may perform necessary data processing using Shor's algorithm or Grover's algorithm.

FIG. 2 is a flowchart illustrating how an electronic device 100 provides a customized content using AI technology according to an embodiment of the present disclosure. According to various embodiments, operations of FIG. 2 may be performed in an order different from the one specified, unless a particular sequence is explicitly required. That is, the operations may be performed in the specified order, may practically be performed simultaneously, or may be performed in the opposite sequence.

In operation 201, the electronic device 100 may receive a request to generate a customized content based on a target area and user information.

According to various embodiments, the electronic device 100 may acquire at least one content related to a target area (e.g., city, town, specific region, specific address, etc.) through the upload of a physical material acquired by an external server or by the operator or user of the electronic device 100. Here, a content related to the target area may include a quantitative content (e.g., a population density content, an economic indicator content, a traffic statistics content, etc.) and a qualitative content (e.g., a social media content, a local community feedback content, etc.). Here, the quantitative and qualitative content s related to the target area may include expert reports, commercial real estate content sources, relevant legal regulations (e.g., federal laws, state laws, city ordinances, etc.), and local commercial properties related to the target area. In addition, the content related to the target area may refer to a content collected by the electronic device 100, which exceeds a preset correlation value.

According to various embodiments, the content related to the target area may include different information depending on the target area. For example, if the first target area is a specific site (e.g., a specific address where a building is located) in Dallas, Texas, and the second target area is a specific site (e.g., a specific address where a building is located) in the Soho area of New York, quantitative content s (e.g., population density content, economic indicator content, traffic statistics content, etc.) and qualitative content s (e.g., social media content, local community feedback content, etc.) acquired by the electronic device 100 may differ due to the differences between the first and second target areas.

According to various embodiments, the electronic device 100 may generate persona information based on user information. Here, the user information may include various constraints a user requesting a customized content is currently experiencing, as well as the user's interests, goals, and so on as an expert.

In one embodiment, the electronic device 100 may generate prompting information requesting the generation of persona information corresponding to the user information. Here, the persona information may refer to unique information that determines the distinct characteristics of each user. For example, the persona information may be user object characteristic information determined based on the characteristics of the user requesting the generation of a customized content. The electronic device 100 may transmit the generated prompting information to an artificial intelligence (AI) server 200. The electronic device 100 may receive a result code from the AI server 200. Based on the received result code, the electronic device 100 may identify the generated persona information.

In operation 203, the electronic device 100 may acquire a content related to a target area.

According to various embodiments, the electronic device 100 may acquire at least one content based on at least one of the following: keyword information related to the target area, year information for content search, and link information for content search.

Keyword information based on a location included in the target area may include name information or nickname information for a state, county, city, town, village, specific region (e.g., urban area, residential area, industrial park, coastal area, suburban area, and administrative unit in South Korea such as do, si, gun, gu, eup, myeon, dong, and ri), specific address, etc. The year information for content search may refer to a year that serves as a reference point for the search. The electronic device 100 may acquire at least one content based on the presence or absence of the keyword information.

The year information for content search refers to a time when a content was created or distributed, and may be set to a specific period such as from 2020 to 2022, 2021, and the first half of 2024. For example, the electronic device 100 may identify a content distributed in a specific year range or a specific year as a content related to the target area.

The link information for content search may include a website or hyperlink that provides external experts'content (e.g., Deloitte® real estate content, KPMG® real estate content, etc.), commercial real estate information companies'content (e.g., CoStar® commercial real estate information company), legal regulation content for the target area (e.g., Gangnam-gu ordinances, South Korean laws, California state laws, federal laws, San Antonio, Texas ordinances, etc.), news content (e.g., CNN®, USA Today®), and local publication content (e.g., local newspapers, Texas Monthly®, San Antonio Express News®, etc.). In one embodiment, the electronic device 100 may request a content related to a target area from an external server, which provides various content s, and may receive the content to store in memory 120. In another example, the electronic device 100 may request various content s from companies, and the received content s may be separately stored in memory 120 by the operator of the electronic device 100.

According to various embodiments, the electronic device 100 may select a content related to the target area from at least one acquired content. In one embodiment, the electronic device 100 may generate prompting information to request verification of which content exceeds a preset correlation threshold among at least one acquired content.

In one embodiment, the electronic device 100 may generate prompting information for evaluating a correlation threshold for the at least one acquired content, based on at least one of location information and name information of the target area. For example, the electronic device 100 may generate prompting information so that a content directly impacting the target area (e.g., a specific address, a specific region, etc.) or related to a range within 10 miles from a specific address is classified as a highly correlated content or a content with a correlation threshold of '3'. In another example, the electronic device 100 may generate prompting information based on the presence of name information referring to the target area within a content, the frequency of the name information, and the role of the name information in the overall topic of the corresponding content. In yet another example, the electronic device 100 may generate prompting information so that the at least one acquired content is not classified as a content related to the target area if the at least one acquired content includes location information or name information of the target area but the location information or name information is far from the main topic of generation of a customized content, such as product sales or book titles.

In operation 205, the electronic device 100 may classify at least one acquired content into multiple categories, each having a different criterion. Here, the multiple categories may be categories into which a content related to the target area is classified based on different criteria. For example, the categories may include 'Macro Industry Trend', 'Micro Industry Trend', 'Demographic Trend', 'Development Pattern', 'Transportation", etc.

In one embodiment, a content classified into the multiple categories may be a content that exceeds a preset correlation threshold among at least one content received by the electronic device 100. For example, the electronic device 100 may select a content with a correlation threshold exceeding a preset correlation threshold of '2 (medium correlation)' or '3 (high correlation)' among at least one content received from an external server, and classify the selected content into relevant categories (e.g., 'Macro Industry Trend', 'Development Pattern') based on the topic, details, and the like of the selected content.

In operation 207, the electronic device 100 may determine at least one category among the multiple categories based on the user information.

According to various embodiments, the electronic device 100 may determine at least one category based on persona information corresponding to the user information. In one embodiment, the electronic device 100 may generate prompting information that requests to identify at least one category related to the persona information. The electronic device 100 may transmit the prompting information to the AI server 200.

In one embodiment, the electronic device 100 may receive a result code from the AI server 200. Based on the received result code, the electronic device 100 may identify at least one category determined. For example, the electronic device 100 may verify whether first persona information is related to the 'Macro Industry Trend' and 'Development Pattern' categories, and whether second persona information is related to the 'Micro Industry Trend' and 'Demographic Trend' categories.

In another embodiment, a category selected to provide a customized content to a user may vary over time. Depending on a specific time or event (e.g., the start of development, the passage of real estate laws, etc.), the collected content may vary, and accordingly, the topic or details to be included in the customized content may vary. The electronic device 100 may change the category, selected based on persona information, on a preset cycle (e.g., daily, weekly, etc.) or may update the category at specific times or events. For example, the electronic device 100 may, at a first point in time, select 'Micro Industry Trend' as a category selected based on first persona information and, at a second point in time, change the category to 'Macro Industry Trend' and 'Development Pattern.'

In yet another embodiment, the electronic device 100 may determine one persona group related to the persona information corresponding to the user information from a plurality of preset persona groups.

For example, the electronic device 100 may set a plurality of persona groups (e.g., CEO group, real estate investor group, sales director group, real estate owner group, etc.), and determine which personal group matches persona information corresponding to information on a user requesting the generation of a customized content. In another example, if the persona information corresponding to the user information does not match any of the plurality of persona groups, the electronic device 100 may generate a new persona group. In yet another example, if the persona information corresponding to the user information does not match any of the plurality of persona groups, the electronic device 100 may determine that the persona information corresponding to the user information is a persona group that is closest in characteristics (e.g., interests, age, etc.) of the plurality of persona groups already generated.

In the above example, the electronic device 100 may identify at least one category corresponding to the persona group. For example, multiple categories associated with each preset persona group may be predefined in advance. A first persona group (e.g., CEO group) may be predefined with associated categories such as 'Macro Industry Trend' and 'Development Pattern.' In the above example, if the persona information corresponding to the user requesting the generation of a customized content is included in the first persona group, the electronic device 100 may provide content s included in the 'Macro Industry Trend' and 'Development Pattern' categories to the user.

In operation 209, the electronic device 100 may provide a content included in at least one determined category.

In one embodiment, the electronic device 100 may display the content included in at least one determined category on a screen of the electronic device 100. In another embodiment, the electronic device 100 may transmit the content included in at least one determined category to a terminal (e.g., external terminal, external server, etc.) of the user who has requested the generation of a customized content.

In one embodiment, the electronic device 100 may provide the content included in at least one determined category to the terminal (e.g., external terminal, external server, etc.) of the user, who has requested the generation of a customized content, at a preset interval (e.g., daily, every two days, weekly, monthly, etc.).

According to various embodiments, the electronic device 100 may receive feedback information regarding the content included in at least one determined category from the user who has requested the generation of a customized content. The feedback information may include interaction data with the content, dwell time data on a website containing the content, and direct feedback data from the user. The interaction data with the content may include data on how many times the user has clicked the content, which piece of the content was clicked, and the time when the content was clicked, etc. The dwell time data on a website containing the content may include data on how long the user stayed on a specific content, how much the user scrolled on the specific content, revisit times data, etc. The direct feedback data from the user may include text data entered directly by the user, evaluation data such as likes or dislikes, etc.

According to various embodiments, the electronic device 100 may transmit the feedback information, received from the user to the AI server 200, as training data for generating a customized content. Thereafter, when receiving a request for the generation of a customized content from the user, the electronic device 100 may provide a customized content generated using AI technology that has been trained based on the feedback information received from the user.

FIGS. 3A to 3D are diagrams illustrating examples of a target area according to an embodiment of the present disclosure.

Figure 3A:
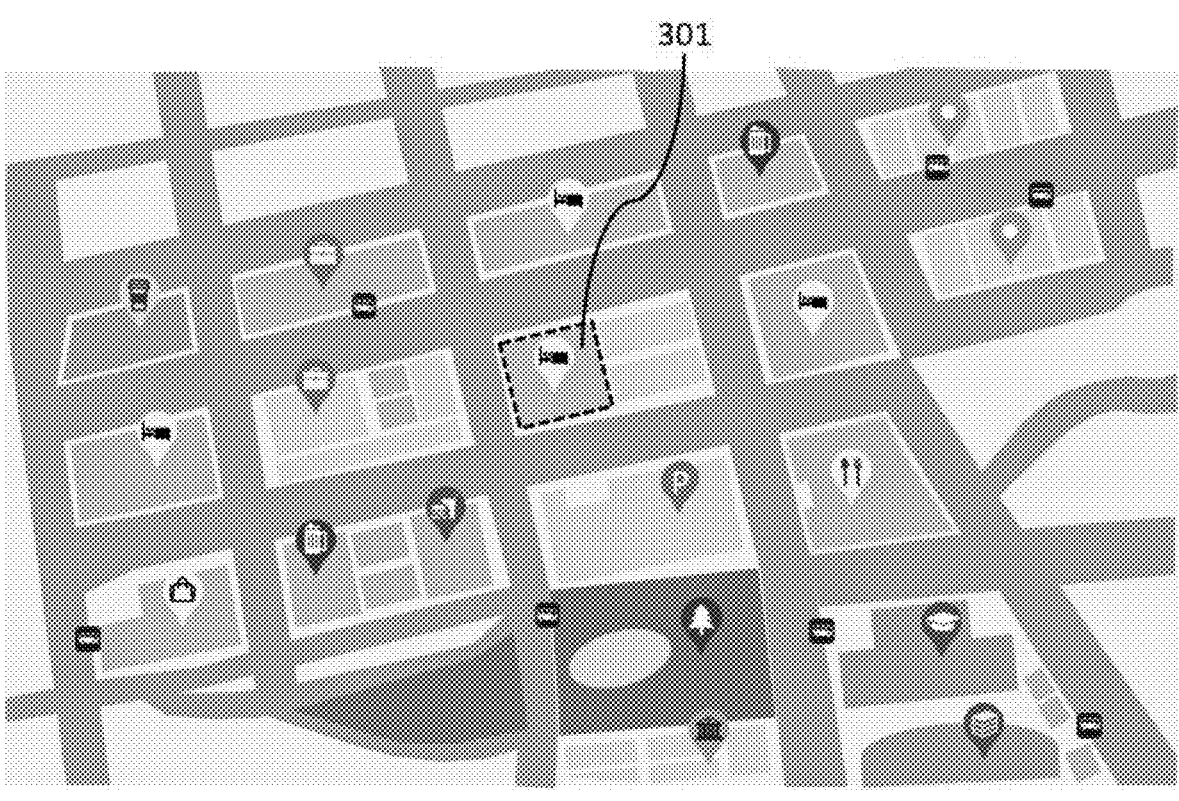
FIGS. 3A to 3D are diagrams illustrating examples of a target area according to an embodiment of the present disclosure.

Referring to FIG. 3A, a target area for providing a customized content may be a specific site 301. Here, the specific site 301 may refer to a particular geographic location or address for providing a customized content.

Figure 3B:
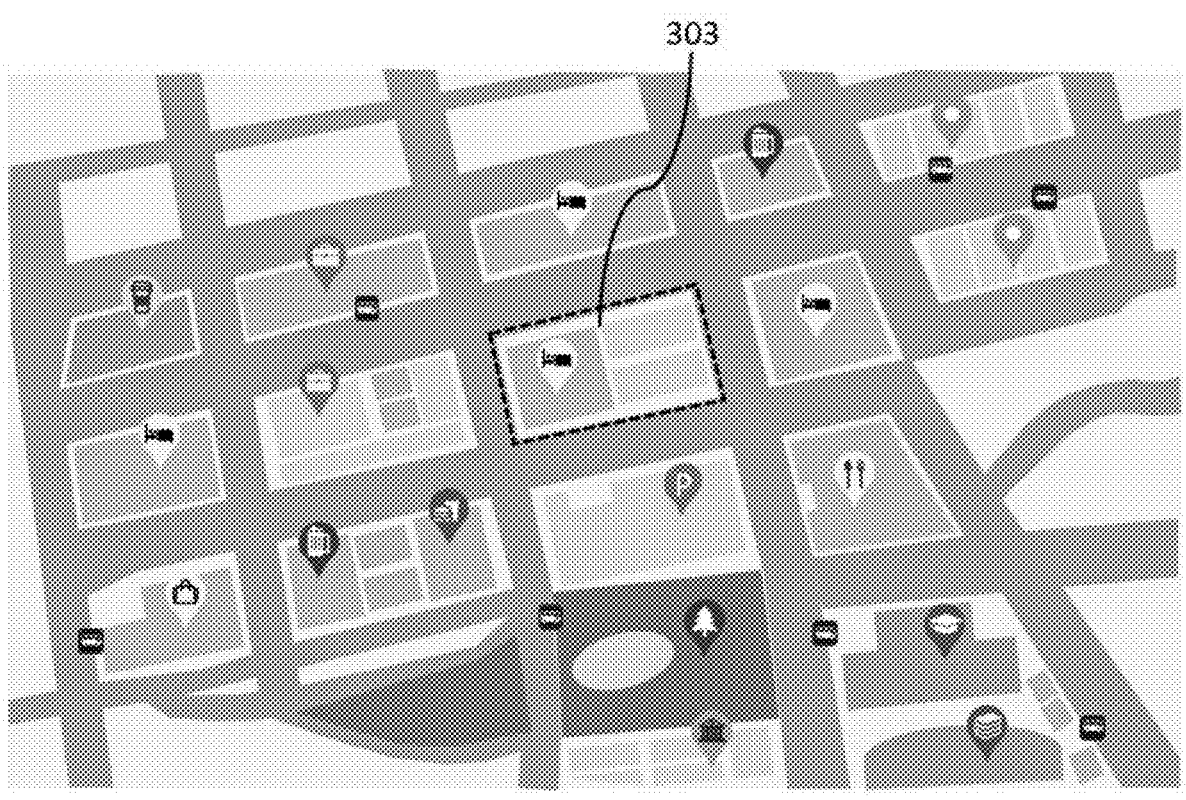

Referring to FIG. 3B, a target area for providing a customized content may be a specific section 303. Here, the specific section 303 may refer to a geographic area for providing a customized content and may include several smaller plots (land units) rather than a single lot.

Figure 3C:
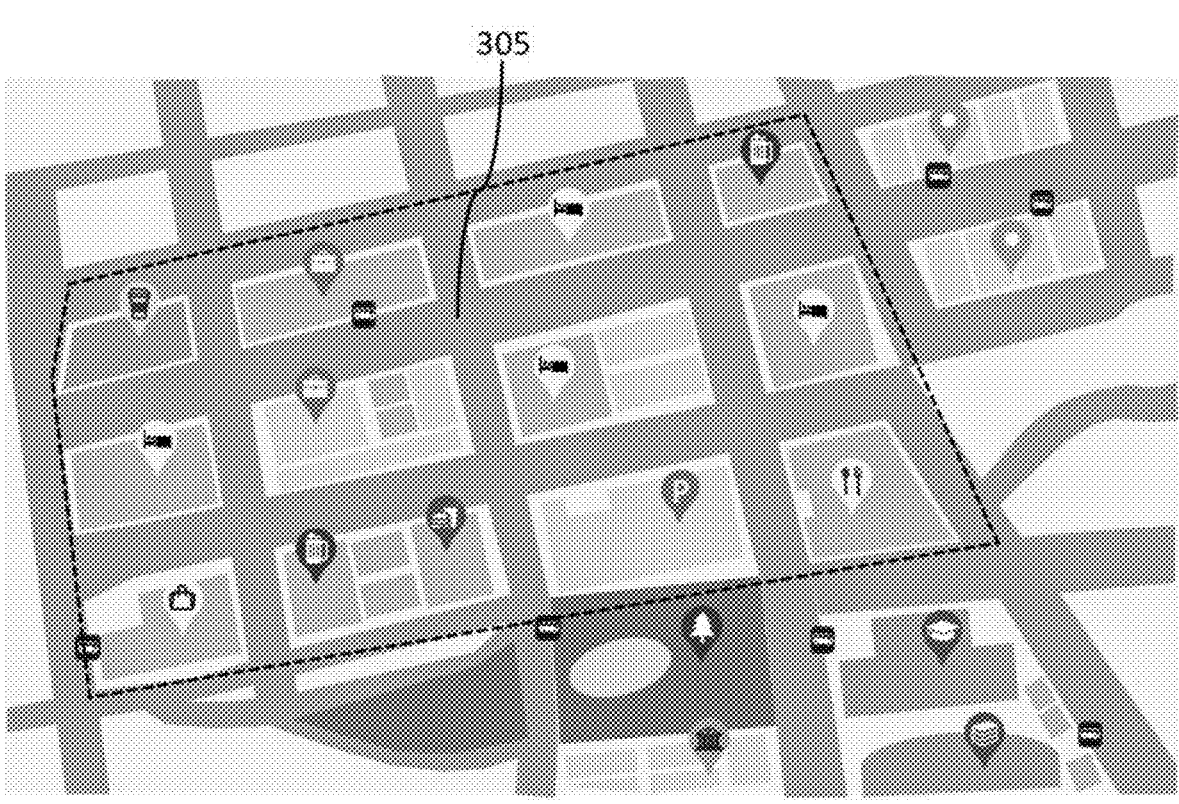

Referring to FIG. 3C, a target area for providing a customized content may be a specific district 305. Here, the specific district 305 may include various types of districts, including an industrial park. For example, the specific district 305 may be an industrial park, a commercial district, a residential district, a historical district, or an educational district. An additional example of the specific district 305 may be the 'Dallas Downtown Historic District', a district in Texas, as shown in FIG. 3C.

Figure 3D:
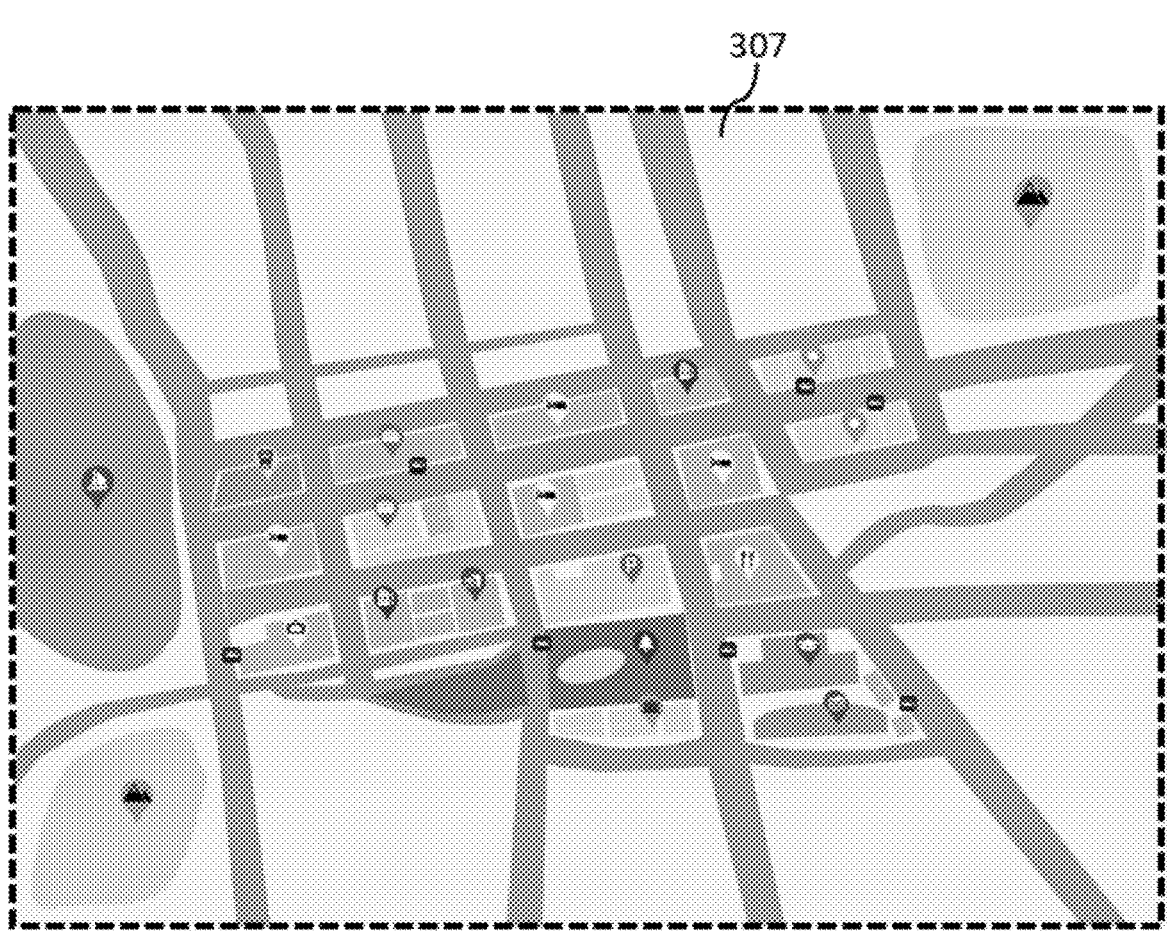

Referring to FIG. 3D, a target area for providing a customized content may be a specific city 307. For example, the specific city 307 may be Dallas, Texas in the United States, or Samseong-dong, Gangnam-gu, Seoul.

FIG. 4 is a diagram illustrating an example of persona information generated using AI technology based on user information according to an embodiment of the present disclosure.

According to various embodiments, persona information generated through AI technology may include at least one of the following: age information, role information, current situation information, interests and goals information, obstacles information, personal characteristics information, and professional aspirations information of a user who has requested the generation of a customized content. For example, the electronic device 100 may generate information about the age, role, current situation, interests and goals, obstacles, personal characteristics, and professional aspirations for each of a first persona and a second persona through AI technology.

Figure 5:
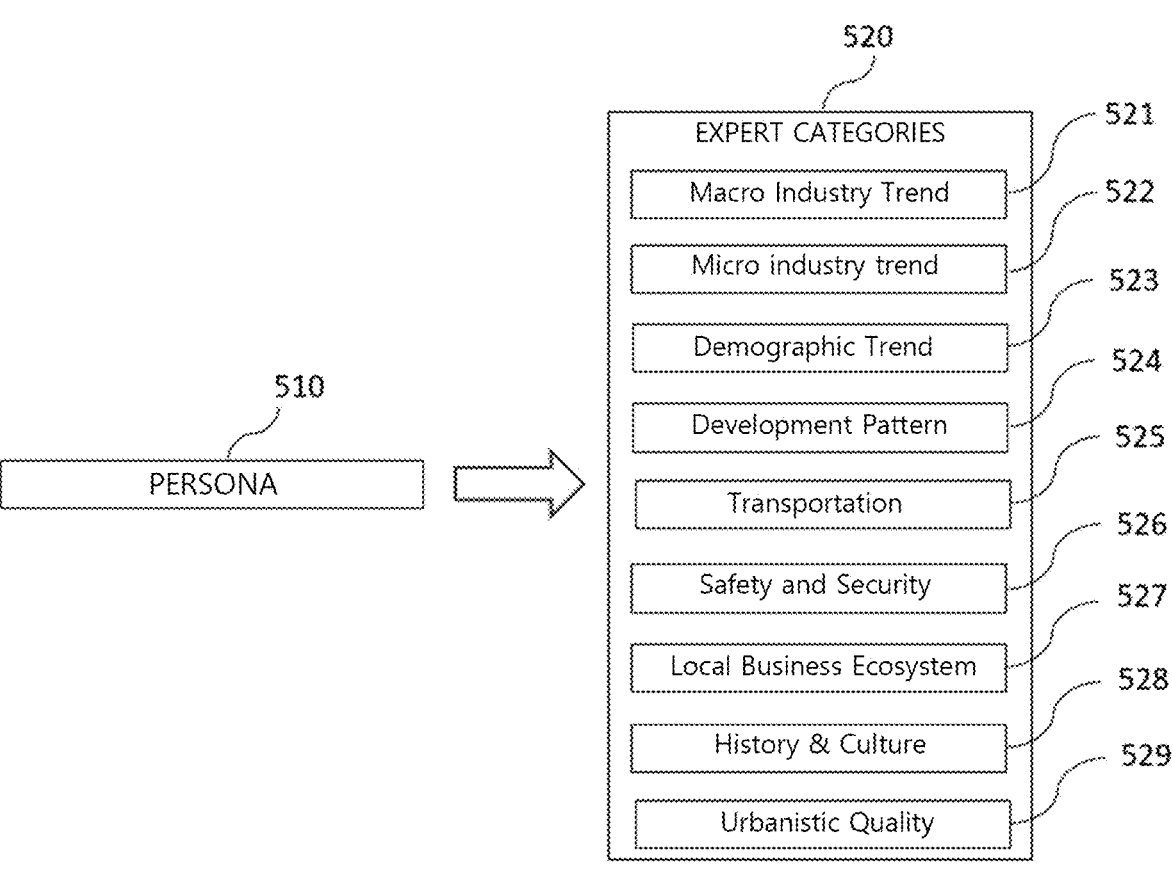
FIG. 5 is a diagram illustrating an example of expert categories to be matched based on persona information according to an embodiment of the present disclosure.

FIG. 5 is a diagram illustrating an example of expert categories to be matched based on persona information according to an embodiment of the present disclosure.

According to various embodiments, the electronic device 100 may identify persona information 510 corresponding to user information. Based on the persona information 510, the electronic device 100 may select at least one category among expert categories 520.

According to various embodiments, the expert categories 520 may include 'Macro Industry Trend' category 521, 'Micro Industry Trend' category 522, 'Demographic Trend' category 523, 'Development Pattern' category 524, 'Transportation' category 525, 'Safety and Security' category 526, 'Local Business Ecosystem' category 527, 'History & Culture' category 528, and 'Urbanistic Quality' category 529.

In one embodiment, the expert categories 520 may be a module of an external electronic device (e.g., external server) or a module included in the electronic device 100 but not shown in FIG. 1. In another embodiment, the expert categories 520 is a database with classified information, and may be stored in the memory of an external electronic device (e.g., external server) or in the memory 120 of the electronic device 100.

In one embodiment, the 'Macro Industry Trend' category 521 may include content s related to economic impact and market strategies, regional demographics, new revenue generation and diversification, etc. In addition, the 'Macro Industry Trend' category 521 may include content s related to trend-based marketing opportunities and guest engagement through social commerce.

The 'Micro Industry Trend' category 522 may include content s related to Market Dynamics and Industry Analysis; Impact of External Factors on Hospitality; Tourism Trends and Attractions; Innovation and Trends in Hospitality; Event-Driven Hospitality Demand; Customer Preferences and Services; Food & Beverage Strategy; Environmental Awareness and Sustainability; Community and Cultural Engagement; and Crisis Management and Contingency.

The 'Demographic Trend's category 523 may include content s related to Demographic Changes and Population Dynamics; Urban Development and Local Economy; Population Growth and Its Implications; and Changes in Industry and Services. The 'Development Pattern' category 524 may include content s related to Urban Development and Planning; Economic and Business Dynamics; Infrastructure and Community Development; Social and Community concerns; and specific industry focus.

The 'Transportation" category 525 may include content s related to Weather and Environmental Impacts on Transportation; Infrastructure and Regulatory Influences; Social and Economic Factors; Urban Planning and City Dynamics; Security and Law Enforcement; and Adaptation and Response to Change. The 'Safety and Security' category 526 may include content s related to Crime and Public Safety; Public Health and Safety; Mass Gatherings and Event Safety; and Emergency Situations and Disaster Response.

The 'Local Business Ecosystem' category 527 may include content s related to Economic Impact and Market Dynamics; Social and Community Development; Environmental and Regulatory Factors; and Luxury and High-End Market Focus. The 'History & Culture' category 528 may include content s related to Historical Significance; Heritage and Landmarks; Cultural Impact; Community Identity and Events; and Economic, Socio-Economic Factors and Business Dynamics. The 'Urbanistic Quality' category 529 may include content s related to Urban Development and Infrastructure; Cultural, Historical, and Community Dynamics; Tourism, Attractions, and Urban Lifestyle; Residential and Economic Impact; and Urban Image, Investment, and Health Concerns.

FIG. 6 is a diagram illustrating an example in which an electronic device 100 classifies a content related to a target area into the categories 520 according to various embodiments of the present disclosure.

According to various embodiments, when the electronic device 100 classifies at least one collected content into multiple categories, each having a different criterion, the electronic device 100 may classify only information exceeding a preset correlation threshold (e.g., correlation threshold '0,' 'low,' '1,' 'normal,' etc.) into the multiple categories and topics included in each of the multiple categories.

In one embodiment, the electronic device 100 may assign a correlation value to at least one content based on a preset correlation measurement function. For example, the electronic device 100 may generate prompting information requesting the evaluation of a correlation between the content related to a target area and the target area itself. The electronic device 100 may transmit the generated prompting information to an artificial intelligence (AI) server 200, and the electronic device 100 may receive a result code from the AI server 200. Based on the received result code, the electronic device 100 may assign a correlation value to each piece of information included in at least one content.

In one embodiment, the electronic device 100 may classify information exceeding a preset correlation threshold (e.g., correlation threshold '0' or '1') into associated categories included in the expert categories 520. For example, the electronic device 100 may classify a content related to a target area as 'news content' and classify each piece of information included in the 'news content' into associated categories.

FIGS. 7A and 7B are diagrams illustrating an example of a customized content according to an embodiment of the present disclosure.

Referring to FIGS. 7A and 7B, the electronic device 100 may provide a customized content included in a category selected based on the persona information 510. For example, the electronic device 100 provides content s included in the 'Demographic Trend's category, the 'Development Pattern' category, 'Safety and Security' category, the 'Transportation" category, the 'Local Business Ecosystem' category, 'Urbanistic Quality' category, and the 'History & Culture' category to a user. Here, the content s provided to the user may be content s related to a target area (e.g., news, local newspaper, global newspaper, etc.) that exceeds a preset correlation threshold.

FIG. 8 is a diagram illustrating an example of a customized content according to an embodiment of the present disclosure.

Referring to FIG. 8, the electronic device 100 may provide a customized content included in a category selected based on the persona information 510. For example, the electronic device 100 may provide content s included in the 'History & Culture' category, the 'Development Pattern' category, the 'Demographics' category, and the 'Transportation" category. In this example, the electronic device 100 may provide the user with a customized content of which the positive and negative aspects within each category are distinguished based on the persona information 510.

For example, the electronic device 100 may analyze and summarize the user's interests and the positive and negative content s included in each category and provide the result to the user. In another example, the electronic device 100 may analyze and summarize recent trends of a content (e.g., an increasing number of Korean restaurants in a specific area over the past three years) and provide the result to the user.

In another example, the electronic device 100 may provide a SWOT analysis within each category based on the persona information 510. For instance, the electronic device 100 may analyze and present the strengths, weaknesses, opportunities, and threats within each category based on the persona information 510. Furthermore, the electronic device 100 may assign a score to each aspect of the SWOT analysis. The electronic device 100 may use a scale (e.g., 1 to 5, 1 to 10) to calculate a score for each aspect of the SWOT analysis (e.g., Content 1: Strengths 3 points, Weaknesses 5 points, Opportunities 1 point, Threats 4 points), and provide the calculated scores to the user.

Figure 9A:
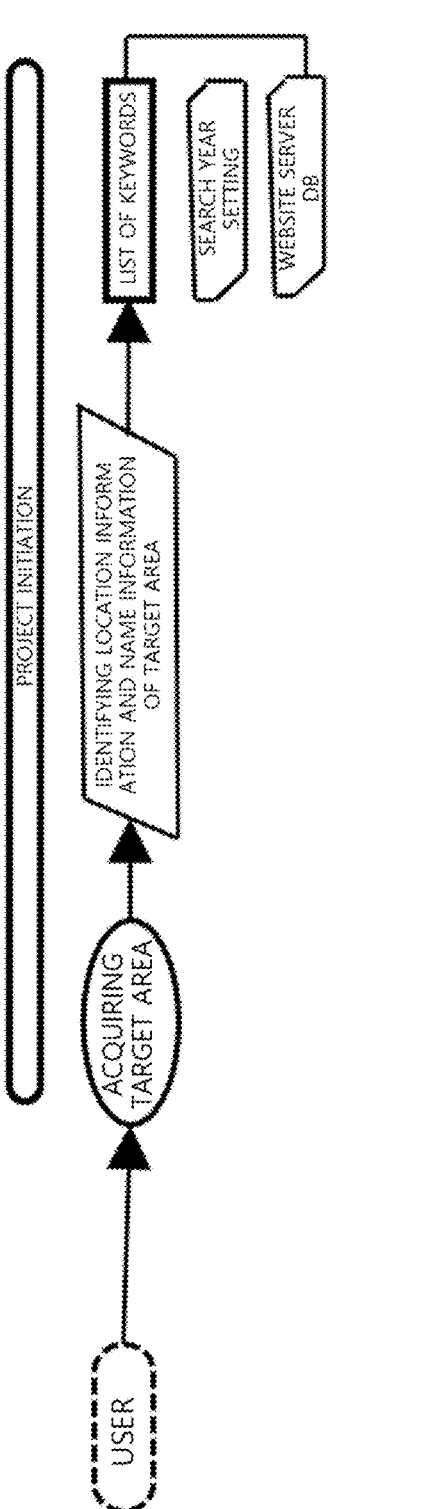
FIGS. 9A to 9C are diagrams illustrating an example in which an electronic device provides a customized content.
Figure 9B:
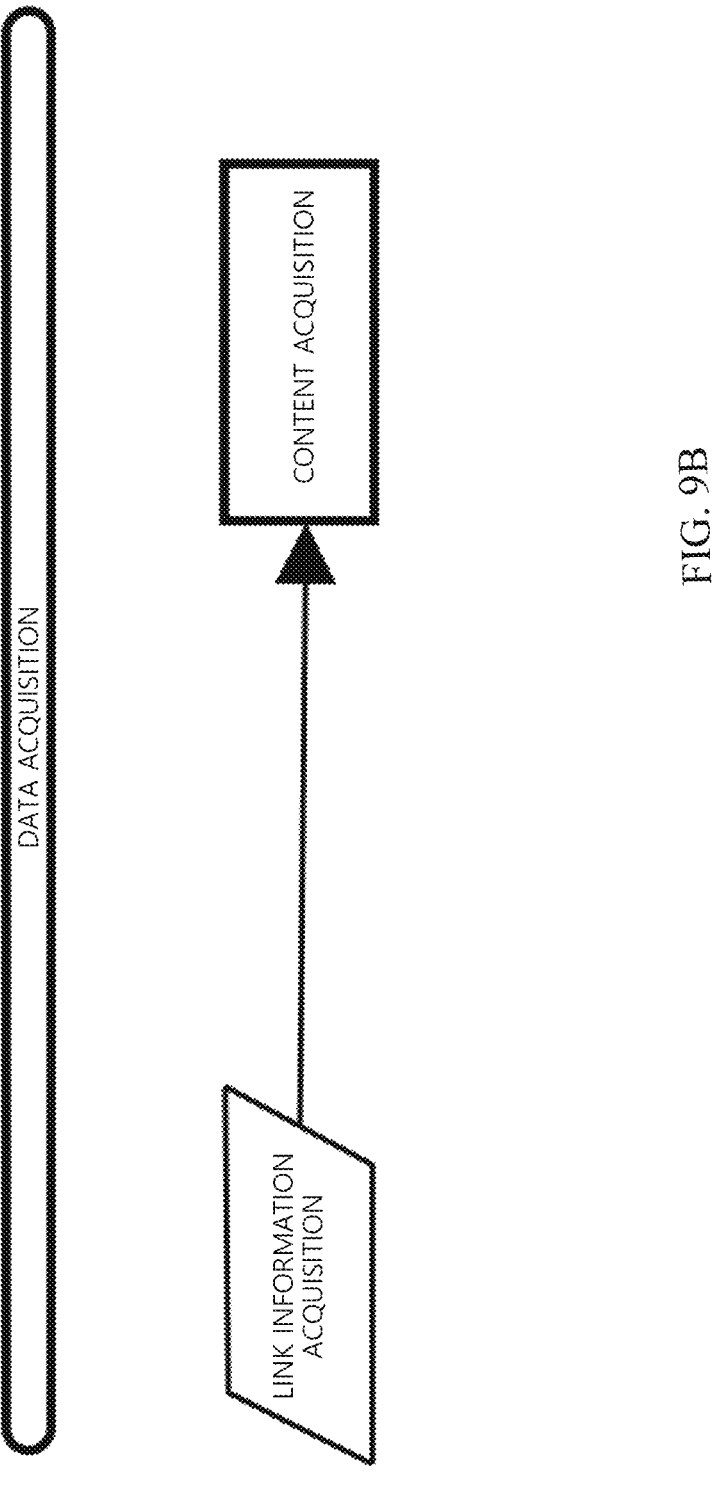
Figure 9C:
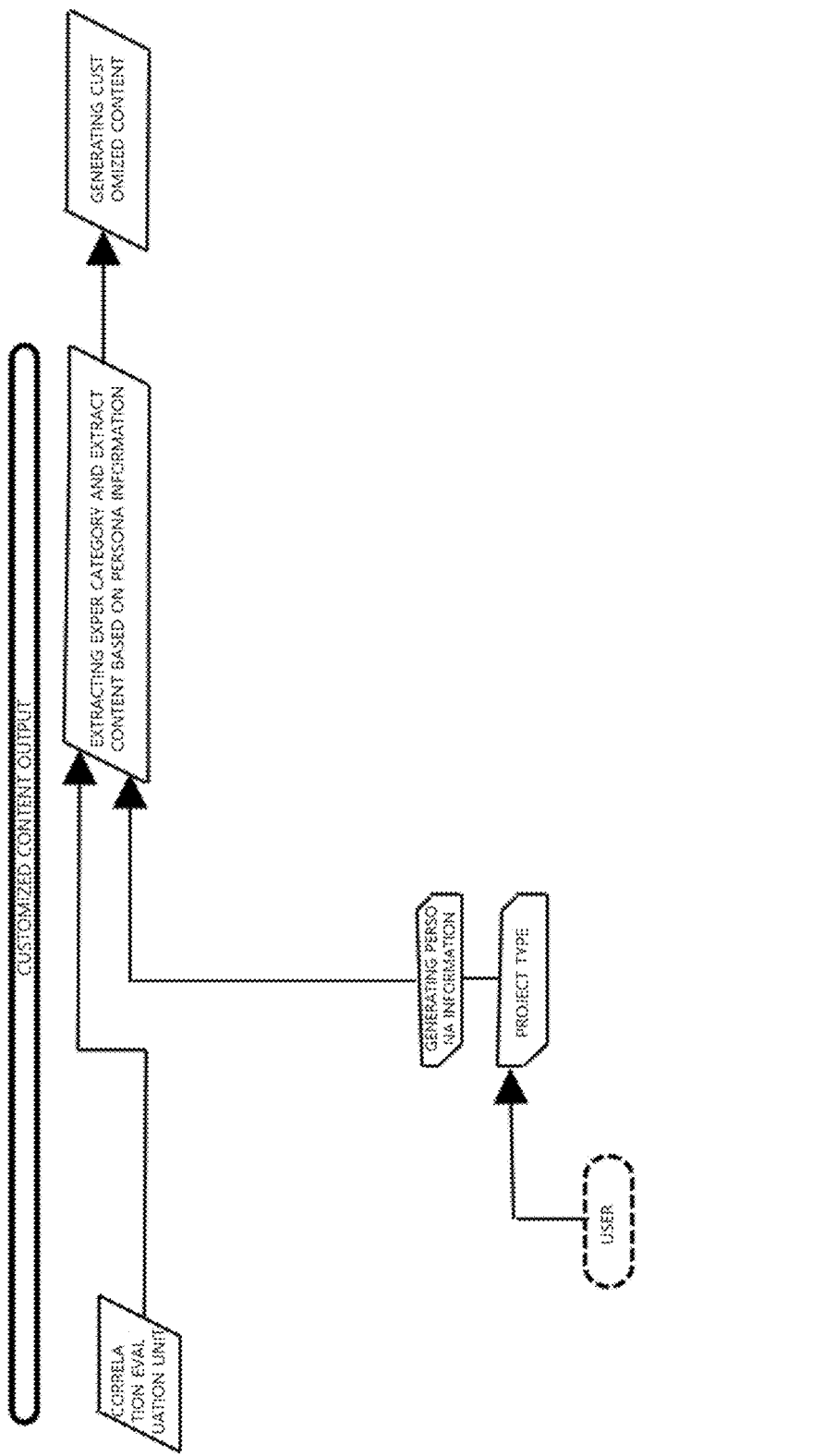

FIGS. 9A to 9C are diagrams illustrating an example in which an electronic device provides a customized content.

Referring to FIG. 9A, an electronic device 100 may receive information about a target area from a user. The electronic device 100 may check location information (e.g., a specific address, a specific district, a specific state, etc.) and name information (e.g., Chicago's nickname "Windy City" or information referring to a place with many clubs as a hotspot) of the target area, as received from the user. The electronic device 100 may store keyword information based on the location and name information of the target area in a database. The electronic device 100 may determine a list of keywords, a search year (e.g., from 2023 to 2024, 2020, etc.), and website server databases (e.g., external servers or external databases to be searched by the electronic device 100).

Referring to FIG. 9B, the electronic device 100 may search for at least one content based on the list of keywords, search year, website server databases, etc., as determined as shown in FIG. 9A. Here, the electronic device 100 may use AI technology to acquire at least one content based on the list of keywords, search year, website server databases, etc.

Referring to FIG. 9C, the electronic device 100 may evaluate a correlation level of at least one acquired content. For example, the electronic device 100 may use AI technology to verify whether the at least one acquired content exceeds a preset correlation threshold (e.g., high correlation, correlation threshold '2,' etc.).

The electronic device 100 may generate persona information corresponding to user information (e.g., the user's age, personal characteristics, goals, interests, obstacles, etc.). The electronic device 100 may determine expert categories (e.g., the 'Macro Industry Trend' category 521, the 'Micro Industry Trend' category 522, the 'Demographic Trend' category 523, etc.) based on the persona information. The electronic device 100 may provide a content included in a selected expert category (e.g., content exceeding a preset correlation threshold) to the user.

Figure 10:
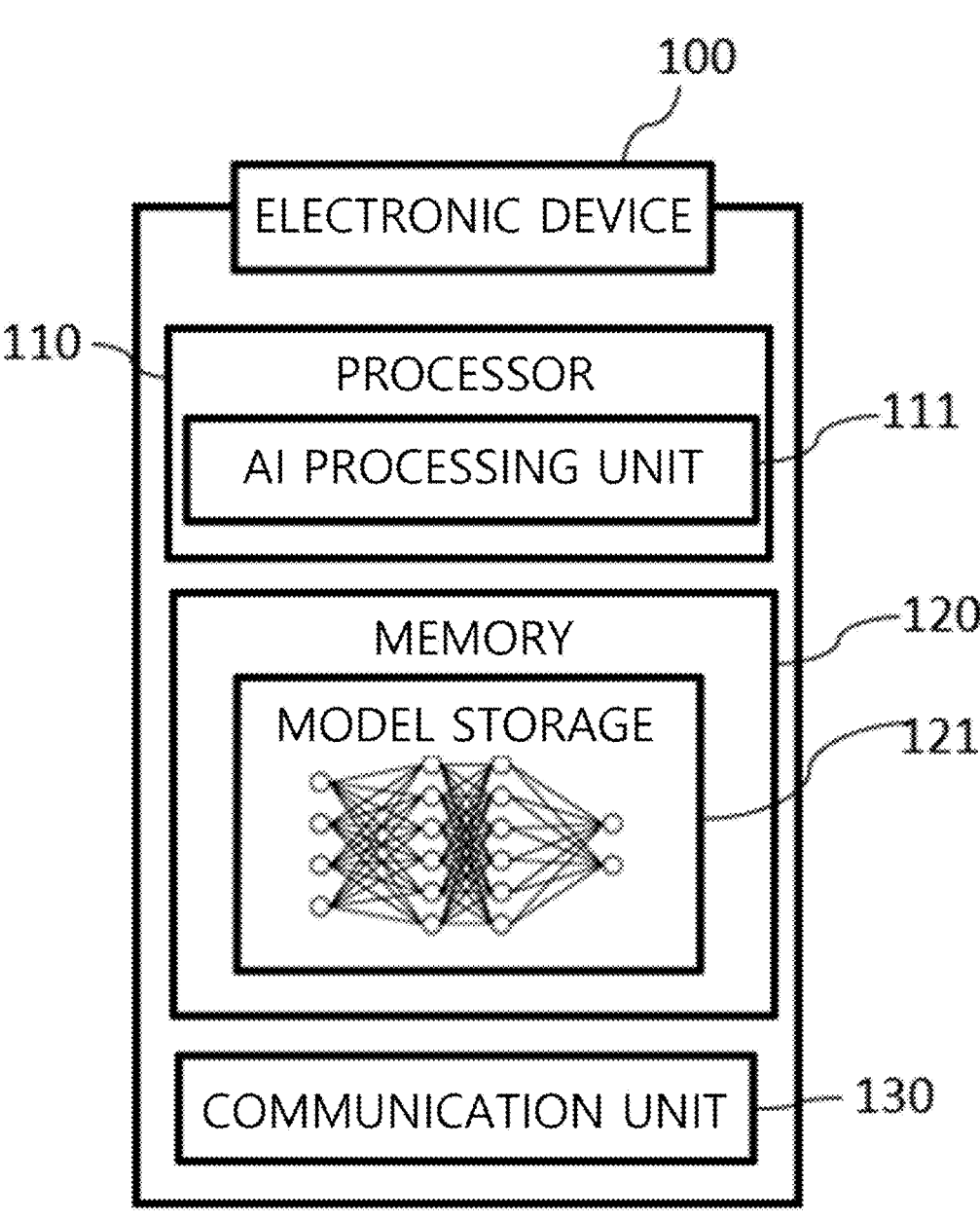
FIG. 10 is a diagram illustrating an example in which an electronic device provides a customized content according to yet another embodiment of the present disclosure.

FIG. 10 is a diagram illustrating an example in which an electronic device provides a customized content according to yet another embodiment of the present disclosure.

According to various embodiments, the electronic device 100 may be connected to other electronic devices (e.g., an external server, etc.) over a network. Communication schemes for a network are not limited. The communication schemes may include not only a communication scheme to utilize a telecommunication network (for example, a mobile communication network, wired Internet, wireless Internet, and a broadcast network), but also a short-range radio communication scheme.

According to various embodiments, the electronic device 100 may perform at least some of the functions performed by the AI server 200 of FIG. 1.

In one embodiment, the processor 110 of the electronic device 100 may include an AI processing unit 111. Since the AI processing unit 111 of the electronic device 100 performs or substantially corresponds to at least some functionalities of the processor 210 and/or the learning processor 220 of the AI server 200, a detailed description thereof is omitted. For example, the AI processing unit 111 of the electronic device 100 may train an artificial neural network using training content, which is one of the functionalities performed by the learning processor 220. Here, a training model may be provided in the electronic device 100 of the artificial neural network, or may be provided in an external device.

In one embodiment, a memory 120 of the electronic device 100 may include a model storage 121. Since the memory 120 of the electronic device 100 substantially corresponds to at least a portion of the memory 240 of the AI server 200 and the model storage 121 substantially corresponds to at least a portion of a model storage of the AI server 200, detailed descriptions of the memory 120 and model storage 121 are omitted. For example, the memory 120 may store a model (or artificial neural network) that is being trained or has already been trained, similar to how the memory 240 of the AI server 200 stores and manages such models.

FIG. 11 is a diagram illustrating an example in which the electronic device 100 provides a customized content using AI technology according to an embodiment of the present disclosure. According to various embodiments, operations of FIG. 11 may be performed in an order different the one specified, unless a particular sequence is explicitly required. That is, the operations may be performed in the specified order, may practically be performed simultaneously, or may be performed in the opposite order.

Since operation 1101 substantially corresponds to operation 201 of FIG. 2, a detailed description thereof is omitted. Although operation 1103 of FIG. 11 substantially corresponds to operation 203 of FIG. 2, the electronic device 100 may generate and transmit prompting information to the AI processing unit 111, instead of the AI server 200, to acquire a content related to a target area. The AI processing unit 111 of the electronic device 100 may generate a result code in response to the prompting information.

Although operation 1105 of FIG. 11 substantially corresponds to operation 205 of FIG. 2, the electronic device 100 may generate and transmit prompting information to the AI processing unit 111, instead of the AI server 200, to classify content into multiple categories, each having a different criterion. The AI processing unit 111 of the electronic device 100 may generate a result code in response to the prompting information.

Although operation 1107 of FIG. 11 substantially corresponds to operation 207 of FIG. 2, the electronic device 100 may generate and transmit prompting information to the AI processing unit 111, instead of the AI server 200, to determine at least one category among the multiple categories based on user information (e.g., persona information corresponding to user information). The AI processing unit 111 of the electronic device 100 may generate a result code in response to the prompting information.

The present disclosure may provide various technical effects and innovations. According to an embodiment of the present disclosure, providing a customized content based on persona information of a user allows for the optimization of content delivery methods and more efficient transmission of necessary information. This approach enhances the emphasis on the content shared with the user, clarifies the meaning of content delivery, saves storage space for related content, and contributes to efficient content processing over a network.

Additionally, by using AI technology to provide optimized content, the computational load required for content generation and transmission on electronic devices is reduced, which in turn decreases power consumption and alleviates server load. Furthermore, efficient content transmission and processing contribute to saving computing resources (e.g., terminals, servers, etc.).

Moreover, providing a customized content using AI technology may diversify and enrich the learning process of artificial intelligence models (e.g., machine learning models). As a result, the versatility and adaptability of artificial intelligence models can be improved, leading to enhanced performance and more accurate results.

FIG. 12 is a diagram illustrating another example in which the electronic device 100 provides a customized content using AI technology according to an embodiment of the present disclosure. According to various embodiments, operations in FIG. 12 may be performed in an order different from the one specified unless a particular sequence is explicitly required. In other words, the operations may occur in the specified order, may be performed practically simultaneously, or may be performed in the opposite order.

Referring to operation 1201, the electronic device 100 may receive a request to generate a customized content based on target information and user information. Here, the target information may include information related to a specific topic or a specific industry. For example, the target information may include information related to industries such as healthcare, stock markets, technology, energy, retail, finance, automotive, entertainment, food and beverage, etc. In addition, the target information may include information about a target area (e.g., city, town, specific region, specific address, etc.) as described in operation 201 of FIG. 2.

According to various embodiments, the creation of persona information for generating a customized content, and the generation of prompting information requesting the creation of persona information corresponding to user information, substantially correspond to operation 201 of FIG. 2, so a detailed description thereof is omitted. Here, persona information may vary depending on target information (e.g., healthcare industry, energy industry, etc.). For example, if the target information is related to the healthcare industry, a first persona may be an internal medicine specialist, while a second persona may be a digital healthcare startup founder. In another example, if the target information is related to the energy industry, a first persona may be a renewable energy project manager, while a second persona may be an energy policy analyst.

In another embodiment, a criterion for setting a persona may differ depending on target information. For example, a criterion for setting a persona based on target information related to the technology industry may differ from a criterion for setting a persona based on target information related to the energy industry, as the characteristics of each industry, user interests, and challenges differ. Here, the criteria for setting a persona may be input and modified by the electronic device 100.

In operation 1203, the electronic device 100 may acquire a content related to the target information.

For example, the electronic device 100 may acquire at least one content based on keyword information related to the target information (e.g., the healthcare industry and/or target area). Here, the process by which the electronic device 100 acquires a content related to the target information substantially corresponds to operation 203 of FIG. 2, so a detailed description is omitted.

In operation 1205, the electronic device 100 may classify the content into multiple different categories. Here, the different categories may vary depending on the target information. For example, if the target information is related to the healthcare industry, a first category may be Medical Devices, a second category may be Pharmaceuticals and Biotechnology, and a third category may be Digital Healthcare. If the target information is related to the automotive industry, a first category may be Vehicle Manufacturing and Design, a second category may be Autonomous Driving, and a third category may be Vehicle Services and Distribution.

Here, the different categories corresponding to each target information may be determined and updated by the electronic device 100 and the AI server 200. For example, if the target information is identified as the healthcare industry, the electronic device 100 may determine multiple categories corresponding to the healthcare industry. Subsequently, if an interaction requesting updates to the determined categories is received, the electronic device 100 may update those categories. In this case, the categories may be updated based on feedback information (e.g., positive feedback, negative feedback, etc.) provided by a user regarding a content.

In operation 1207, the electronic device 100 may determine at least one category among the multiple categories based on user information. Since operation 1207 substantially corresponds to operation 207 of FIG. 2, a detailed description is omitted.

In operation 1209, the electronic device 100 may provide a content included in at least one of the multiple categories. Since operation 1209 substantially corresponds to operation 1209 of FIG. 2, a detailed description is omitted.

At least part of the devices (e.g., modules or functions thereof) or methods (e.g., operations) according to various embodiments may be implemented with instructions as programming modules that are stored in computer-readable storage media. In one embodiment, an instruction, when executed by a processor (e.g., the processor 110, the processor 210, etc.), may cause one or more processors to perform functions corresponding to the instruction. The computer-readable storage medium may be, for example, a memory (e.g., the memory 120 or memory 240).

According to various embodiments, the computer-readable recording medium may include a computer program stored on the medium to execute the method according to any one of claims in combination with hardware. For example, the computer-readable recording medium may include various storage devices such as a hard disk, a floppy disk, magnetic media (e.g., magnetic tape), optical media (e.g., CD-ROM, DVD, magneto-optical media (e.g., floppy disk)), hardware devices (e.g., ROM, RAM, flash memory), and the like.

In addition, examples of program instructions may include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

The technical features disclosed in each embodiment of the present disclosure are not limited to a corresponding embodiment, and unless incompatible with each other, the technical features disclosed in each embodiment may be applied in combination to other embodiments. It will be further understood by those within the art that any disjunctive word and/or phrase presenting two or more alternative terms, whether in the description, claims, or drawings, can be understood to contemplate the possibilities of including one of the terms, either of the terms, or both terms. For example, the phrase "A or B" will be understood to include the possibilities of "A" or "B" or "A and B." Further, the term "each," as used herein, in addition to having its ordinary meaning, can mean any subset of a set of elements to which the term "each" is applied. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims and equivalents thereof.

What is claimed is:

1. A method for providing a customized content by an electronic device, the method comprising:
   receiving a request to generate the customized content based on a target area and user information;
   based on the request for generating the customized content:
      generating prompting information requesting generation of persona information corresponding to the user information, wherein the persona information comprises at least one of the following: age information, role information, current situation information, interests and goals information, obstacles information, personal characteristics information, and professional aspirations information of a user who has requested the generation of the customized content;
      transmitting the generated prompting information to an artificial intelligence (AI) server;
      receiving a result code from the AI server;
      identifying the generated persona information based on the received result code;
   acquiring a content related to the target area;
   classifying the content into multiple categories, each having a different criterion;
   determining at least one category among the multiple categories based on the user information and corresponding to the identified persona information generated by the AI server; and
   providing a content included in the at least one determined category based on the persona information.

2. The method of claim 1, wherein the acquiring of a content related to the target area comprises acquiring at least one content based on at least one of the following: keyword information related to the target area, year information for content search, and link information for content search.

3. The method of claim 2, wherein the acquiring of a content related to the target area further comprises:
   generating prompting information requesting verification of a content that exceeds a preset correlation threshold among the at least one content;
   transmitting the generated prompting information to an artificial intelligence (AJ) server; receiving a result code from the AI server; and
   based on the received result code, identifying a content exceeding the preset correlation threshold.

4. The method of claim 3, wherein the generating of prompting information comprises generating prompting information for evaluating a correlation level of the at least one content based on at least one of location information and name information of the target area.

5. The method of claim 1, wherein the determining of at least one category among the multiple categories based on the user information comprises:
   determining a persona group related to the persona information among a plurality of preset persona groups; and
   identifying the at least one determined category corresponding to the determined persona group.

6. The method of claim 1, wherein the determining of at least one category among the multiple categories based on the user information comprises:

generating prompting information requesting identification of at least one category related to the persona information among the multiple categories;

transmitting the generated prompting information to the AI server;

receiving a result code from the AI server; and identifying the at least one determined category, based on the received result code.

7. The method of claim 1, wherein the providing of a content included in the at least one determined category further comprises providing, at a preset interval, the content included in the at least one determined category to a terminal of the user.

8. The method of claim 1, further comprising:

receiving feedback information regarding the content included in the at least one determined category from the user; and transmitting the received feedback information to an AI server as training data for generating a customized content.

9. An electronic device providing a customized content, the electronic device comprising:

a memory storing instructions, and a processor configured to execute the instructions to:

receive a request to generate the customized content based on a target area and user information;

based on the request for generating the customized content:

generate prompting information requesting generation of persona information corresponding to the user information, wherein the persona information comprises at least one of the following: age information, role information, current situation information, interests and goals information, obstacles information, personal characteristics information, and professional aspirations information of a user who has requested the generation of the customized content;

transmit the generated prompting information to an artificial intelligence (AI) server;

receive a result code from the AI server;

identify the generated persona information based on the received result code;

acquire a content related to the target area;

classify the content into multiple categories, each having a different criterion;

determine at least one category among the multiple categories based on the user information and corresponding to the identified persona information generated by the AI server; and provide a content included in the at least one determined category based on the persona information.

10. The electronic device of claim 9, wherein the processor is configured to acquire at least one content based on at least one of the following: keyword information related to the target area, year information for content search, and link information for content search.

11. The electronic device of claim 10, wherein the processor is configured to generate prompting information requesting verification of a content exceeding a preset correlation threshold among the at least one content, transmit the generated prompting information to an artificial intelligence (AI) server, receive a result code from the AI server, and based on the received result code, identify a content exceeding the preset correlation threshold.

12. The electronic device of claim 11, wherein the processor is configured to generate prompting information for evaluating a correlation threshold of the at least one content based on at least one of location information and name information of the target area.

13. The electronic device of claim 9, wherein the processor is configured to determine a persona group related to the persona information among a plurality of preset persona groups, and identify the at least one determined category corresponding to the determined persona group.

14. The electronic device of claim 9, wherein the processor is configured to generate prompting information requesting selection of the at least one determined category corresponding to the persona information among the multiple categories, transmit the generated prompting information to the AI server, receive a result code from an intelligent server, and identify the at least one determined category based on the received result code.

15. The electronic device of claim 9, wherein the processor is configured to provide, at a preset interval, the content included in the at least one determined category to a terminal of the user.

16. The electronic device of claim 9, wherein the processor is configured to receive feedback information regarding the content included in the at least one determined category from the user, and transmit the received feedback information to an AI server as training data for generating a customized content.

* * * * *